US011507145B2

(12) United States Patent
Nakamura et al.

(10) Patent No.: US 11,507,145 B2
(45) Date of Patent: Nov. 22, 2022

(54) HINGE DEVICE AND ELECTRONIC APPARATUS

(71) Applicant: Lenovo (Singapore) Pte. Ltd., Singapore (SG)

(72) Inventors: Fusanobu Nakamura, Kanagawa (JP); Atsushi Nagashima, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/376,603

(22) Filed: Jul. 15, 2021

(65) Prior Publication Data

US 2022/0057844 A1    Feb. 24, 2022

(30) Foreign Application Priority Data

Aug. 24, 2020  (JP) ............................. JP2020-141186

(51) Int. Cl.
*G06F 1/16* (2006.01)
*E05F 1/12* (2006.01)

(52) U.S. Cl.
CPC .......... *G06F 1/1681* (2013.01); *E05F 1/1207* (2013.01); *E05Y 2900/606* (2013.01); *G06F 1/1616* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,266,766 | B2* | 9/2012 | Huang | G06F 1/1681 16/303 |
| 9,310,848 | B2* | 4/2016 | Fujino | G06F 1/1681 |
| 9,645,606 | B2* | 5/2017 | Tong | F16F 9/12 |
| 10,180,701 | B2* | 1/2019 | Nakamura | G06F 1/1643 |
| 10,228,724 | B2* | 3/2019 | Nakamura | G06F 1/1677 |
| 11,061,444 | B2* | 7/2021 | Nakamura | G06F 1/162 |
| 11,353,931 | B2* | 6/2022 | Hsu | G06F 1/1681 |
| 2005/0015930 | A1 | 1/2005 | Jankovich et al. | |
| 2014/0218855 | A1* | 8/2014 | Fujino | G06F 1/1681 361/679.29 |
| 2016/0201367 | A1* | 7/2016 | Kato | E05D 3/122 361/679.09 |
| 2018/0024589 | A1* | 1/2018 | Nakamura | G06F 1/1643 361/679.09 |

(Continued)

FOREIGN PATENT DOCUMENTS

| | | |
|---|---|---|
| JP | 2004-194267 A | 7/2004 |
| JP | 3189566 U | 3/2014 |

(Continued)

*Primary Examiner* — Lisa Lea-Edmonds

(74) *Attorney, Agent, or Firm* — Osha Bergman Watanabe & Burton LLP

(57) ABSTRACT

A hinge device includes a shaft that is rotatable around the axis, and a torque imparting portion configured to impart a rotational torque to rotation of the shaft. The torque imparting portion includes: a ring having a shaft insertion hole through which the shaft is inserted with rattling, the ring covering a part of an outer circumferential face of the shaft in the axis direction; an elastic member that biases the ring in the axis direction from a position displaced from the axis of the shaft; and an adjuster configured to adjust a force that the elastic member biases the ring.

12 Claims, 14 Drawing Sheets

(56) References Cited

U.S. PATENT DOCUMENTS

2018/0024590 A1* 1/2018 Nakamura ............ G06F 1/1616
                                                    349/58
2022/0057844 A1* 2/2022 Nakamura ............ G06F 1/1681

FOREIGN PATENT DOCUMENTS

JP    2018-105318 A    7/2018
JP    2019-190518 A   10/2019

* cited by examiner

HINGE DEVICE AND ELECTRONIC APPARATUS

CROSS-REFERENCE TO RELATED APPLICATIONS

This application claims priority to Japanese Patent Application No. 2020-141186 filed on Aug. 24, 2020. The entire disclosure of this application is incorporated herein by reference.

TECHNICAL FIELD

The present invention relates to a hinge device for connecting two chassis relatively rotatably and an electronic apparatus equipped with the hinge device.

BACKGROUND

Electronic apparatuses such as a laptop PC have a configuration of including two chassis that are connected relatively rotatably via a hinge device. This type of electronic apparatuses needs to be able to stably hold the chassis in a desired angular posture while ensuring a smooth rotational movement between the chassis. To this end, the hinge device has to be able to generate an appropriate rotational torque.

For instance, the mechanism for generating a rotational torque is configured so that one end of a bracket fixed to a chassis is curled and this end is wound around a hinge shaft to generate sliding resistance. This configuration, however, has a problem of difficulty to adjust the magnitude of the torque. Then, another mechanism for generating a rotational torque has been proposed, having flat springs sandwiched between a bracket and a shaft to generate sliding resistance (see Japanese Unexamined Patent Application Publication No. 2019-190518).

Japanese Unexamined Patent Application Publication No. 2019-190518 as stated above is configured to adjust the rotational torque by adjusting the pressing force of the flat springs. In other words, this configuration adjusts the tightening force with the nut to directly deform the flat springs with this tightening force, and thus adjusts the rotational torque of the shaft. This configuration has a problem that a slight change of the tightening with the nut causes an unexpectedly great deformation of the flat springs and excessively increases a rotational torque. In this way, this configuration has difficulty in fine adjustment of the rotational torque, and has a narrow adjustment range of the torque.

SUMMARY OF THE INVENTION

One or more embodiments provide a hinge device enabling easy adjustment of the rotational torque and an electronic apparatus equipped with such a hinge device.

A hinge device according to one aspect includes: a shaft rotatable around an axis thereof; and a torque imparting portion configured to impart a rotational torque to rotation of the shaft. The torque imparting portion includes: a ring having a shaft insertion hole through which the shaft is inserted with rattling, the ring covering a part of an outer circumferential face of the shaft in the axis direction; and an elastic member that biases the ring in the axis direction from a position displaced from the axis of the shaft; and an adjuster configured to adjust a force that the elastic member biases the ring. The torque imparting portion is configured so that the elastic member biases the ring to press the shaft while catching the shaft at a first opening edge of the shaft insertion hole on one side in the axis direction and at a second opening edge on the other side, and thus impart a rotational torque to the shaft.

An electronic apparatus according to another aspect includes: a first chassis; a second chassis adjacent to the first chassis; and a hinge device including a shaft that is rotatable around an axis thereof, and a torque imparting portion configured to impart a rotational torque to rotation of the shaft, the hinge device connecting the first chassis and the second chassis in a relatively rotatable manner. The torque imparting portion includes: a ring having a shaft insertion hole through which the shaft is inserted with rattling, the ring covering a part of an outer circumferential face of the shaft in the axis direction; an elastic member that biases the ring in the axis direction from a position displaced from the axis of the shaft; and an adjuster configured to adjust a force that the elastic member biases the ring. The torque imparting portion is configured so that the elastic member biases the ring to press the shaft while catching the shaft at a first opening edge of the shaft insertion hole on one side in the axis direction and at a second opening edge on the other side, and thus impart a rotational torque to the shaft.

One or more embodiments of present invention enable easy adjustment of the rotational torque.

DETAILED DESCRIPTION

Figure 1:
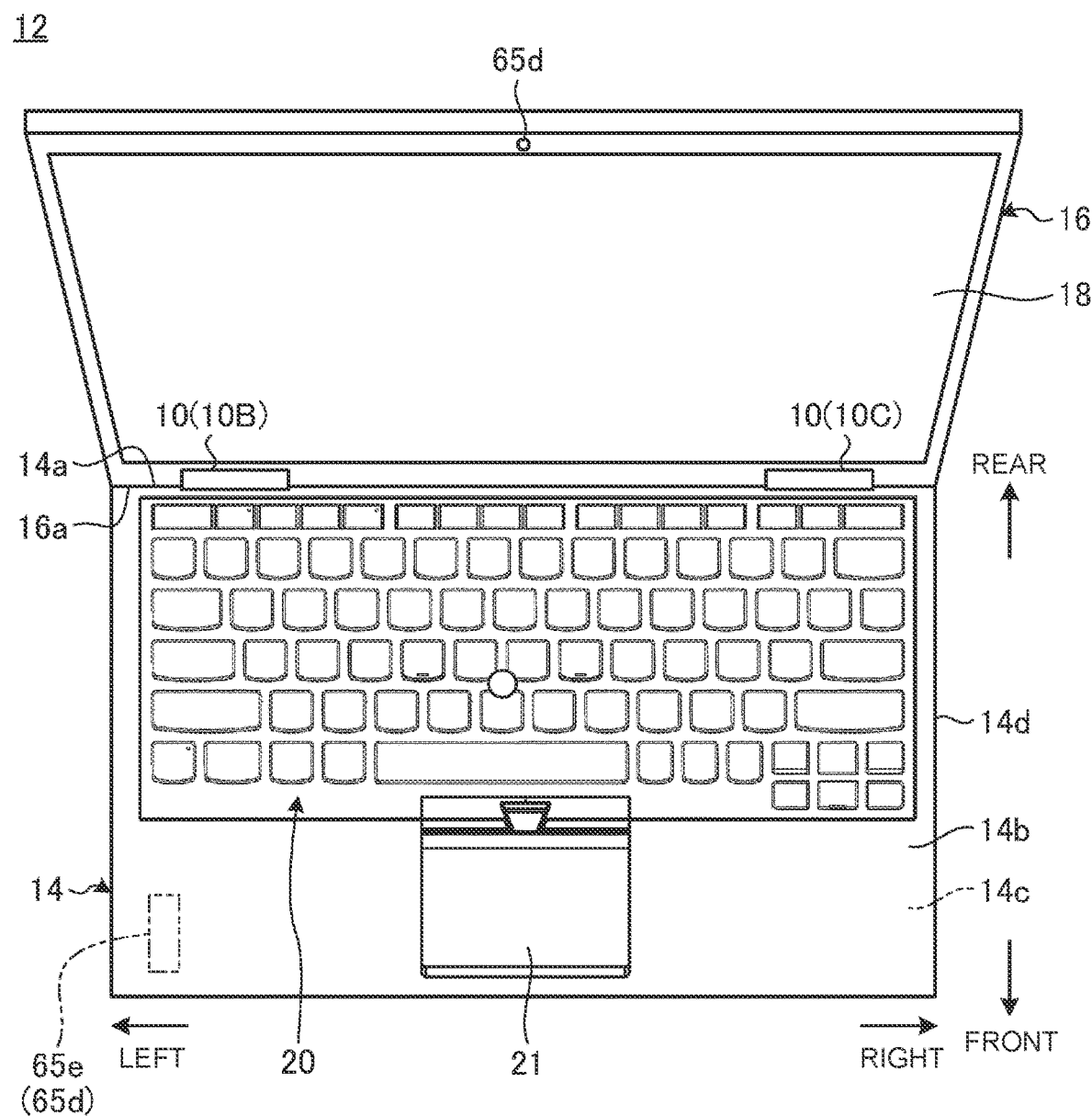
FIG. 1 is a schematic top plan view of an electronic apparatus equipped with a hinge device according to a first embodiment.

Referring to the drawings, the following describes a hinge device and an electronic apparatus according to embodiments of the present invention in details by way of preferable embodiments.

FIG. 1 is a schematic top plan view of an electronic apparatus 12 equipped with a hinge device 10 according to a first embodiment. As illustrated in FIG. 1, the electronic apparatus 12 is a clamshell-type laptop PC including a first chassis 14 and a second chassis 16 that are relatively rotatably connected with the hinge device 10. The electronic apparatus of the present invention may be of various types of electronic apparatuses other than the laptop PC, such as a mobile phone, a smartphone, and a portable game machine.

The following describes the hinge device 10 and the chassis 14 and 16 with reference to the posture of the electronic apparatus, in which the chassis 14 and 16 are set so that their surface normal directions intersect at right angles (90 degrees). When a user views the display 18 mounted in the first chassis 14, a part closer to the user is front, a part away from the user is rear, the width direction is left and right, and the height direction is top and bottom.

First, the overall configuration of the electronic apparatus 12 will be described. The electronic apparatus 12 is configured to connect the lower end 14a of the first chassis 14 and the lower end 16a of the second chassis 16 with a pair of left and right hinge devices 10. Instead of the pair of left and right hinge devices, the number of hinge devices may be one or three or more.

The first chassis 14 is a flattened box including an upper cover 14b and a lower cover 14c. The first chassis 14 has a top face defined with the upper cover 14b and a bottom face defined with the lower cover 14c. The four peripheral side faces of the first chassis 14 are defined with a vertical wall 14d on one of the covers 14b and 14c (see FIG. 2, for example). A keyboard 20 and a touch pad 21 are placed on the top face of the first chassis 14. The first chassis 14 accommodates various types of electronic components such as a motherboard, an arithmetic device, a memory and a battery unit.

The second chassis 16 is a flattened box that is thinner than the first chassis 14. A display 18 is placed on the front face of the second chassis 16. For instance, the display 18 is a liquid crystal display or an organic light emitting diode (OLED) display.

Figure 2:
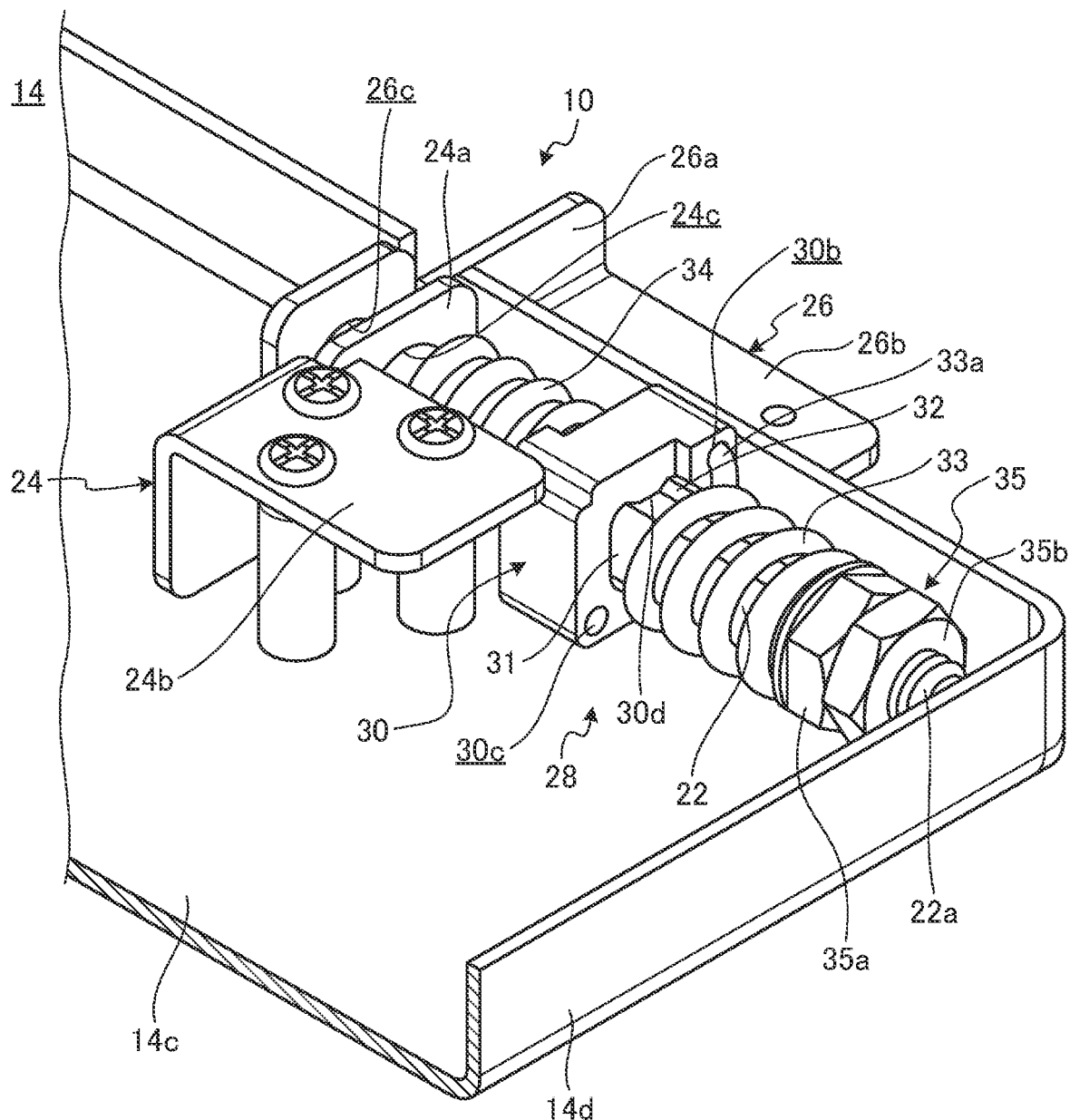
FIG. 2 is an enlarged perspective view of the hinge device and its surroundings.
Figure 3:
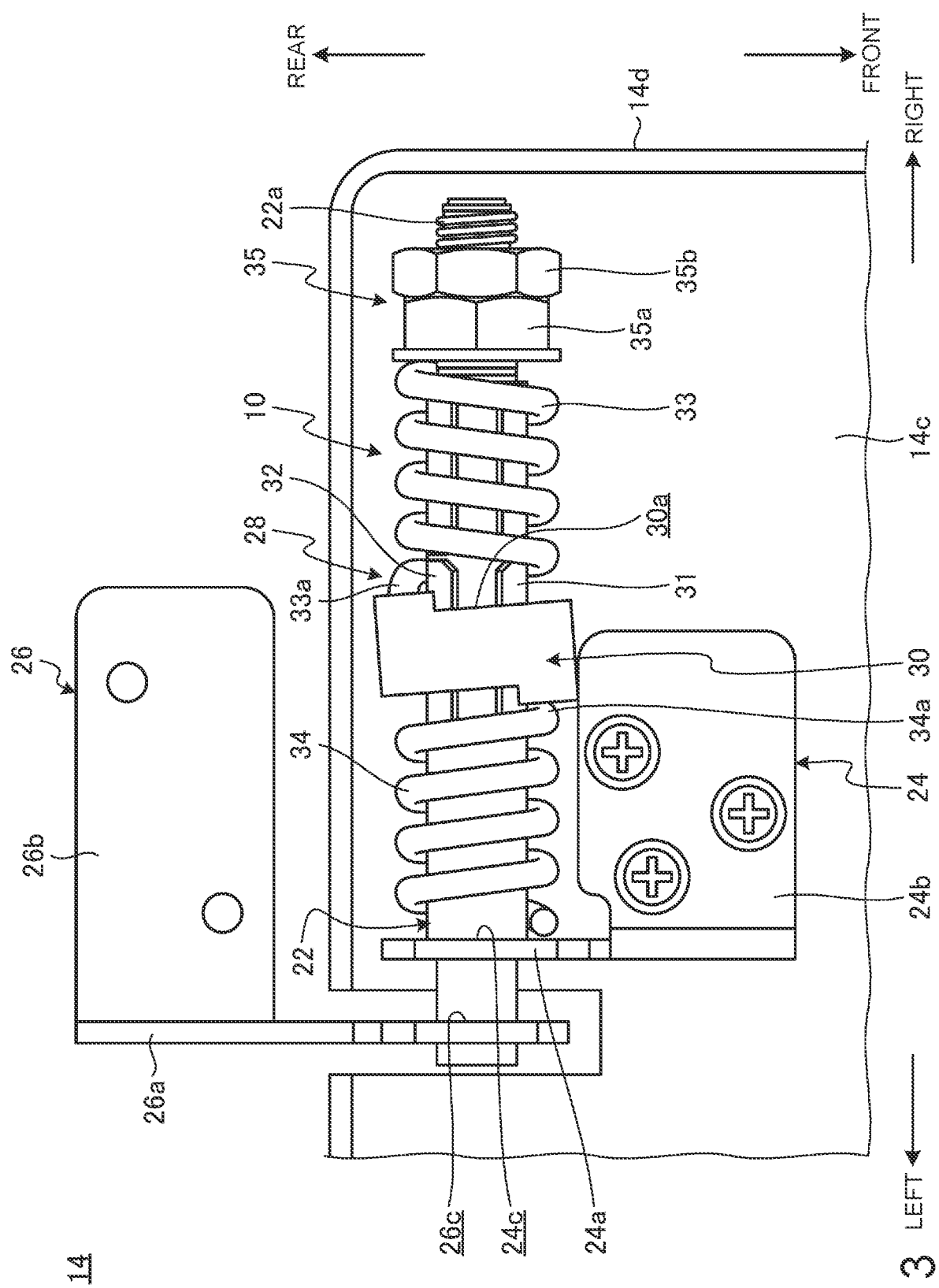
FIG. 3 is a plan view of the hinge device illustrated in FIG. 2 and its surroundings.

Next the following describes the specific configuration example of the hinge device 10. FIG. 2 is an enlarged perspective view of the hinge device 10 and its surroundings. FIG. 3 is a plan view of the hinge device 10 illustrated in FIG. 2 and its surroundings. Since the left and right hinge devices 10 have the same configuration except that they are symmetrical to the left and right, one of the hinge devices 10 will be described below and the other hinge device 10 will be omitted.

As illustrated in FIGS. 2 and 3, the hinge device 10 includes a shaft 22, a first bracket 24, a second bracket 26, and a torque imparting portion 28.

Figure 4:
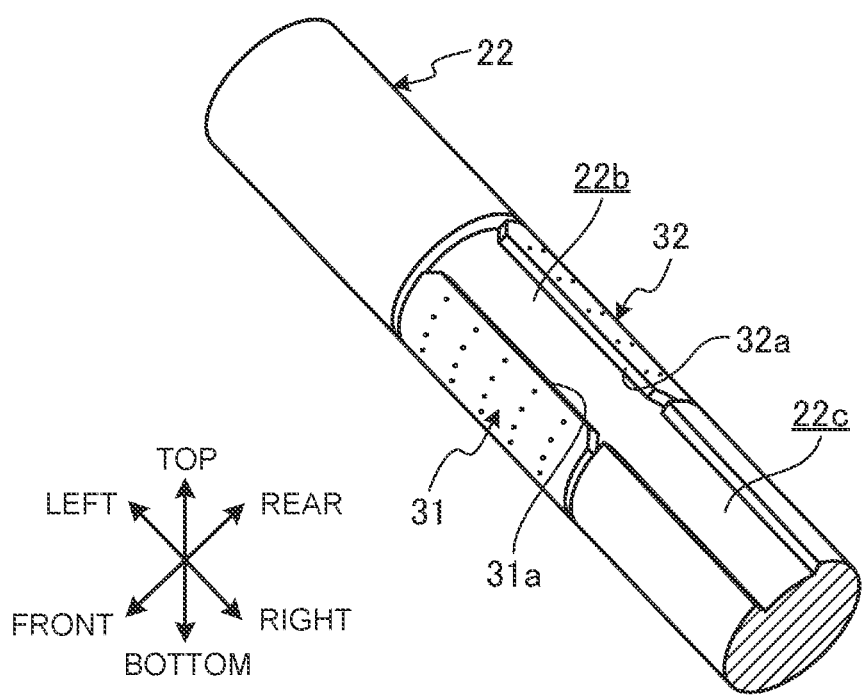
FIG. 4 is an enlarged perspective view of the major part of the shaft.

FIG. 4 is an enlarged perspective view of the major part of the shaft 22. As illustrated in FIGS. 2 to 4, the shaft 22 is a metal round bar that serves as the rotary shaft of the hinge device 10, and its axis direction is arranged in the left-right direction. The shaft 22 is rotatably supported around the axis relative to the first chassis 14.

The shaft 22 has an external thread 22a on the outer circumferential face at a first end (right end in FIG. 3) and its vicinity. The portion with the external thread 22a has a smaller outer diameter than the other portion. The shaft 22 connects to brackets 24 and 26 on the outer circumferential face at a second end (left end in FIG. 3) and its vicinity. The shaft 22 has an annular recessed portion 22b on the outer circumferential face at a substantially center in the longitudinal direction. The annular recessed portion 22b has a smaller outer diameter than the other portion to be recessed inwardly. The shaft 22 also has a pair of groove-like recessed portions 22c on the outer circumferential face. The recessed portions 22c as a pair are radially opposed and extend in the axis direction. These recessed portions 22c are formed between the annular recessed portion 22b and the external thread 22a. The portion with the pair of recessed portions 22c has an outer diameter that is equal to or less than the outer diameter of the portion with the annular recessed portion 22b and is equal to or more than the outer diameter of the portion with the external thread 22a.

As illustrated in FIGS. 2 and 3, the first bracket 24 is a metal plate for securing the hinge device 10 to the first chassis 14. The first bracket 24 has a shaft connecting plate 24a and a chassis connecting plate 24b.

The shaft connecting plate 24a is placed orthogonal to the axis direction of the shaft 22. The shaft connecting plate 24a has a hole 24c, through which the shaft 22 is inserted relatively rotatably. The chassis connecting plate 24b is bent by 90 degrees from the shaft connecting plate 24a to extend in the front, rear, left and right directions. In the configuration example illustrated in FIG. 2, the chassis connecting plate 24b is screwed to bosses standing from the inner face of the lower cover 14c. The chassis connecting plate 24b may be screwed to the inner face of the upper cover 14b. With this configuration, the first chassis 14 supports the shaft 22 relatively rotatably via the first bracket 24.

As illustrated in FIGS. 2 and 3, the second bracket 26 is a metal plate for securing the hinge device 10 to the second chassis 16. The second bracket 26 has a shaft connecting plate 26a and a chassis connecting plate 26b.

The shaft connecting plate 26a is placed orthogonal to the axis direction of the shaft 22, and is parallel to the shaft connecting plate 24a of the first bracket 24. The shaft connecting plate 26a has a fitting hole 26c, through which the shaft 22 is inserted non-rotatably. This means that the second bracket 26 rotates with the shaft 22 around the axis of the shaft 22. The chassis connecting plate 26b is bent by 90 degrees from the shaft connecting plate 26a to extend in the front, rear, left and right directions. The chassis connecting plate 26b is screwed to the second chassis 16. With this configuration, the second chassis 16 is connected to be rotatable relative to the first chassis 14 via the second bracket 26 and the shaft 22.

As illustrated in FIGS. 2 and 3, the torque imparting portion 28 gives a predetermined rotational torque to the rotation of the shaft 22 to generate a predetermined rotational torque of the rotational movement between the chassis 14 and 16. The torque imparting portion 28 has a ring 30, a first plate 31, a second plate 32, a first coil spring 33, a second coil spring 34, and an adjuster 35.

Figure 5:
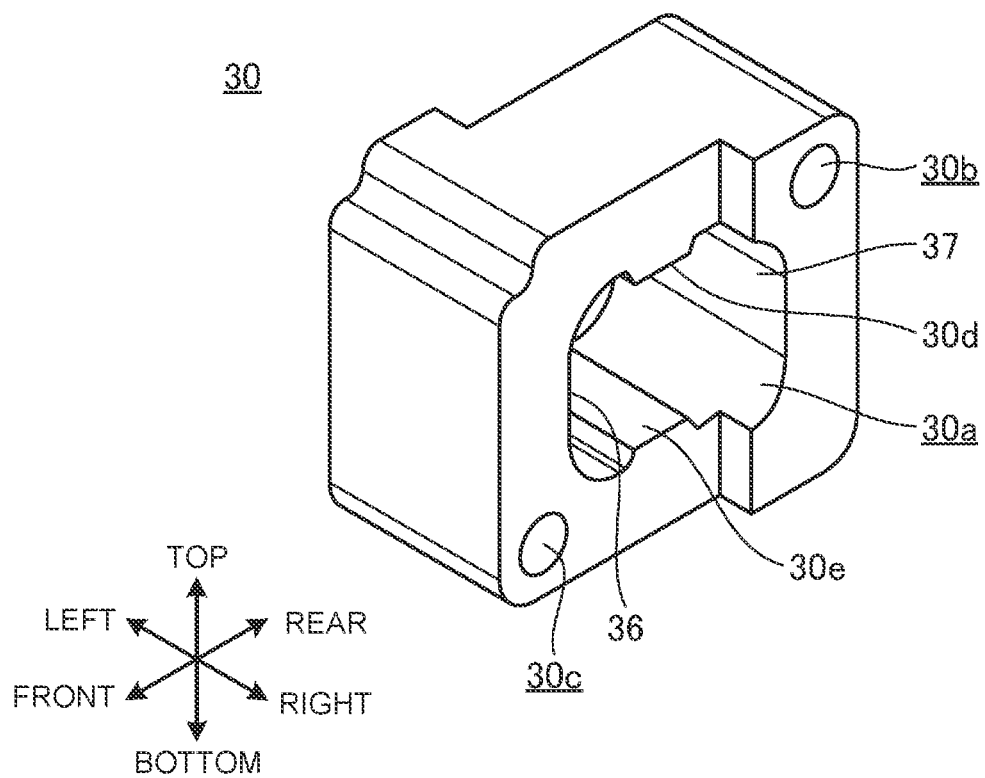
FIG. 5 is a perspective view of the ring.
Figure 6A:
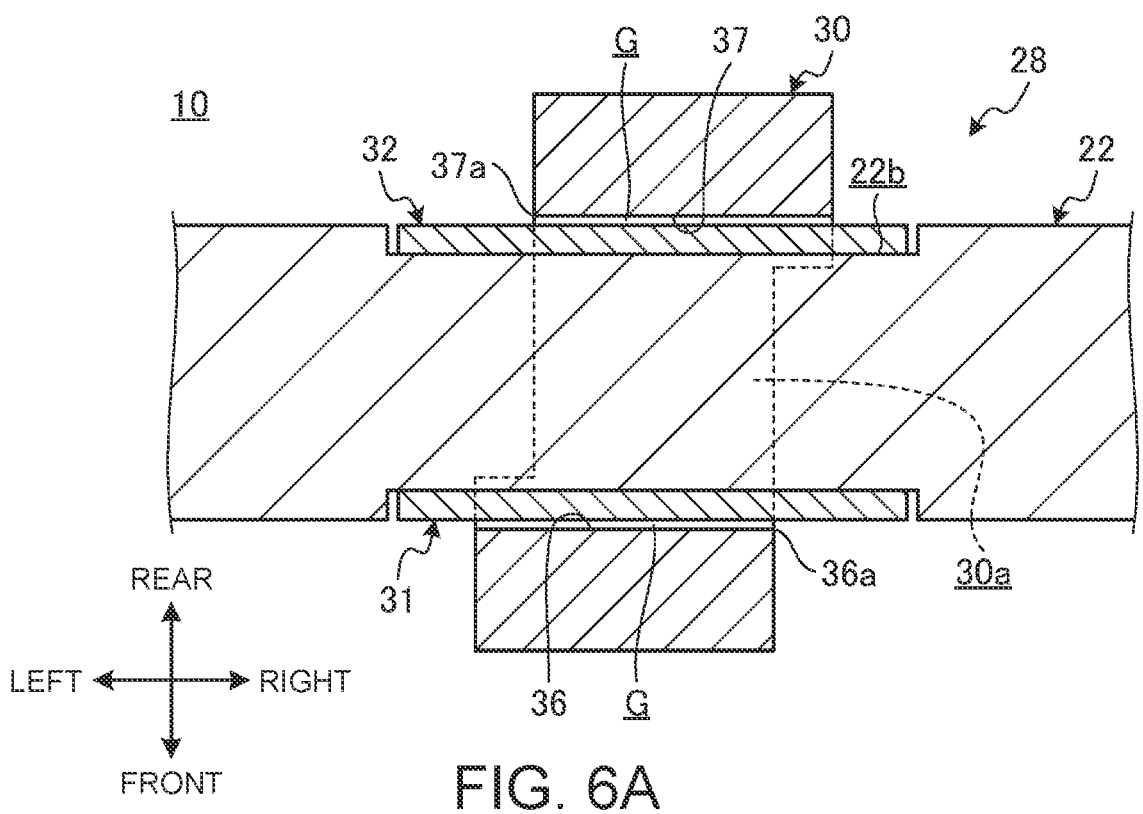
FIG. 6A is a schematic cross-sectional view of the hinge device taken along a plane in the axis direction of the shaft.
Figure 6B:
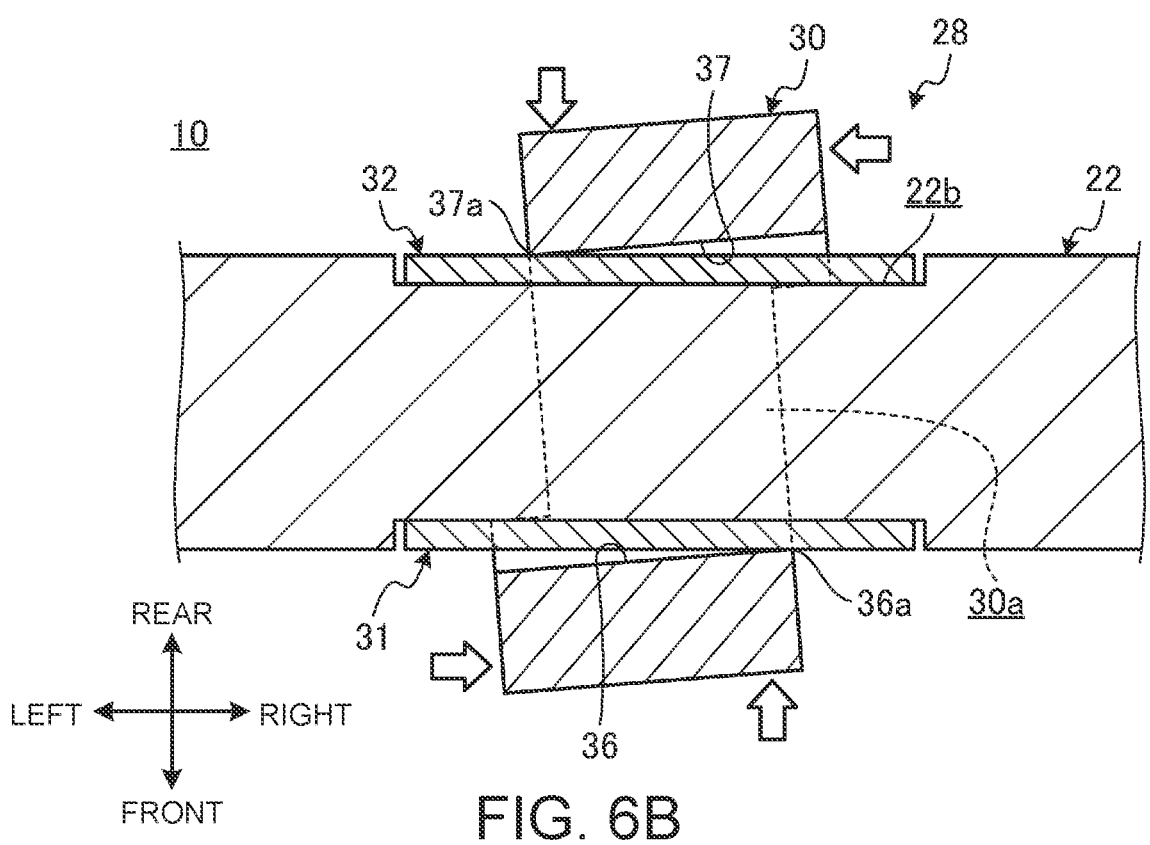
FIG. 6B is a cross-sectional view of the ring having an inclined posture after the released posture illustrated in FIG. 6A.
Figure 7:
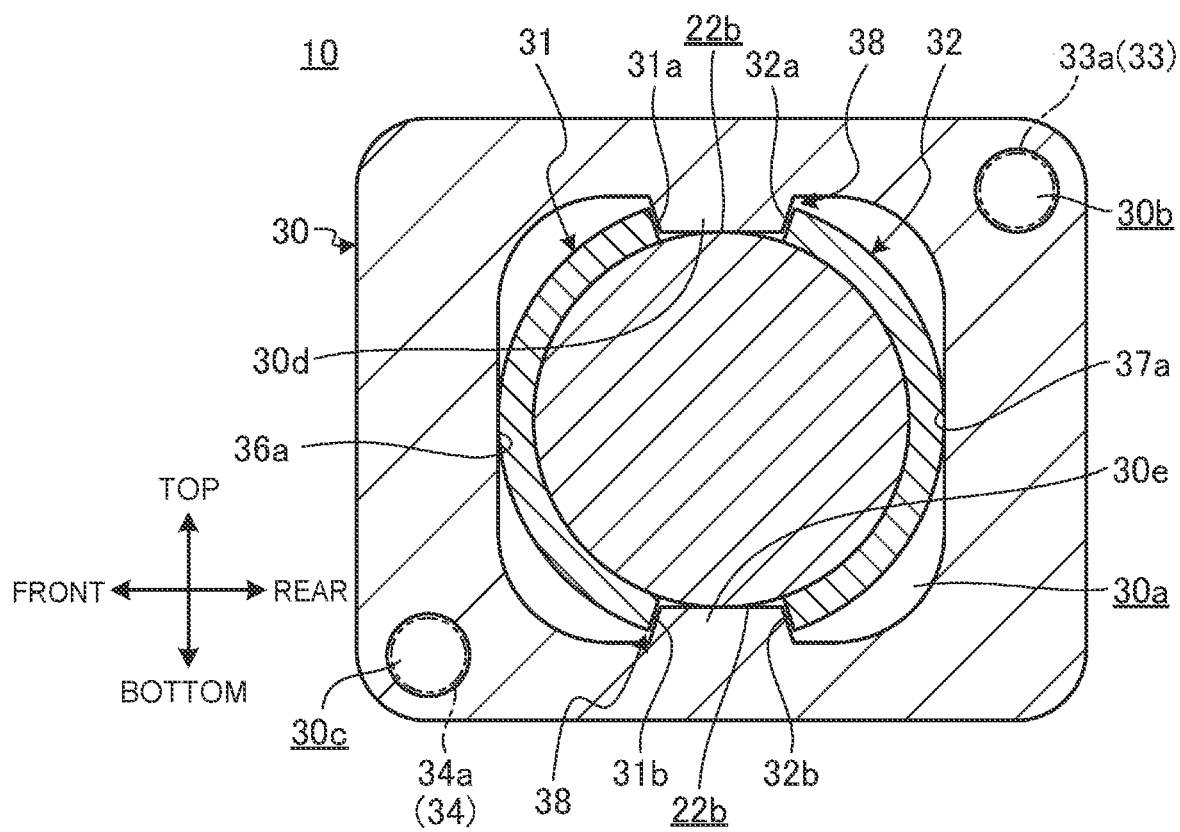
FIG. 7 is a schematic cross-sectional view of the hinge device taken along a plane orthogonal to the axis direction of the shaft.

FIG. 5 is a perspective view of the ring 30. FIG. 6A is a schematic cross-sectional view of the hinge device 10 taken along a plane in the axis direction of the shaft 22. FIG. 6B is a cross-sectional view of the ring 30 having an inclined posture after the released posture illustrated in FIG. 6A. FIG. 7 is a schematic cross-sectional view of the hinge device 10 taken along a plane orthogonal to the axis direction of the shaft 22.

As illustrated in FIGS. 2, 3 and 5, the ring 30 is a component having an angular tubular shape or having thick plates, which is shorter than the shaft 22 in the axis direction and has a substantially crank shape in a plan view. The ring 30 may be rectangular in a plan view. The ring 30 is a metal component made of stainless steel, for example. The ring 30 is placed in a position surrounding the annular recessed portion 22b of the shaft 22. In this embodiment, plates 31, 32 are disposed on the annular recessed portion 22b. The ring 30 is then placed so that the plates 31 and 32 are sandwiched between the ring 30 and the outer circumferential face of the annular recessed portion 22b.

The ring 30 has a shaft insertion hole 30a, a pair of fitting holes 30b and 30c, and a pair of ribs 30d and 30e.

The shaft insertion hole 30a allows insertion of the shaft 22 with some rattling. The shaft insertion hole 30a of the present embodiment has a substantially elliptical shape that is long in the front-rear direction and short in the top-bottom direction. FIG. 6A illustrates the state where the shaft insertion hole 30a and the shaft 22 have the same axis directions. In this state, the inner peripheral faces 36 and 37, which are front and rear shorter sides, of the shaft insertion hole 30a have a predetermined gap G with the outer circumferential face of the shaft 22 (in this embodiment, the outer faces of the plates 31 and 32). This gap G creates rattling between the inner peripheral faces of the shaft insertion hole 30a and the outer circumferential face of the shaft 22 (plates 31 and 32). The gap G at each part is about 0.2 mm, for example, for the outer diameter of the shaft 22 including the plates 31, 32 of 5 mm. Preferably the shaft insertion hole 30a has a small gap between the upper and lower inner peripheral faces, which are the long sides, and the outer circumferential face of the shaft 22. This is to prevent the ring 30 from moving in the top-bottom direction. In the present embodiment, this part has the ribs 30d and 30e that engage with a part between end faces 31a and 32a and a part between end faces 31b and 32b of the plates 31 and 32, respectively.

With this configuration, the ring 30 having the shaft 22 inserted into the shaft insertion hole 30a is rotatable at least around the virtual axis in the top-bottom direction. As a result, as illustrated in FIG. 6B, when the ring 30 rotates counterclockwise in a plan view from the state of FIG. 6A, the right opening edge 36a of the inner peripheral face 36 and the left opening edge 37a of the inner peripheral face 37 come in contact with the outer circumferential face of the shaft 22 (plates 31 and 32).

The fitting holes 30b and 30c support ends 33a and 34a of the coil springs 33 and 34, respectively. For instance, the fitting holes 30b and 30c are through holes formed in the axis direction of the shaft insertion hole 30a. The fitting hole 30b is formed in the upper rear corner of the ring 30. The fitting hole 30c is formed in the lower front corner of the ring 30. In other words, the fitting holes 30b and 30c are located in the diagonal direction of the shaft insertion hole 30a when the ring 30 is viewed in the axis direction of the shaft insertion hole 30a.

The ribs 30d and 30e are protrusions having a substantially trapezoidal cross section, which protrude from the upper and lower inner peripheral faces, respectively, that are the long sides of the shaft insertion hole 30a. The ribs 30d and 30e extend in the axis direction of the shaft insertion hole 30a.

As illustrated in FIGS. 4, 6A and 7, the first plate 31 is an arc-shaped plate that covers most of the front half of the annular recessed portion 22b of the shaft 22. The second plate 32 is an arc-shaped plate that covers most of the rear half of the annular recessed portion 22b. For instance, the plates 31 and 32 are made of metal such as stainless steel. The plates 31, 32 are pressed against the outer circumferential face of the shaft 22 by the ring 30 to function like brake pads, and thus give a predetermined rotational torque to the shaft 22.

As illustrated in FIG. 4, the plates 31 and 32 are porous plates with a large number of micropores. These micropores hold predetermined grease. This grease gives appropriate sliding resistance between the plates 31, 32 and the shaft 22 and suppresses wear of the plates 31, 32 and the shaft 22. These porous plates 31 and 32 allow the grease to be held in their micropores for a long period of time, and allow the influx of a small amount of the grease gradually into the sliding interface between the plates 31, 32 and the shaft 22 for a long period of time.

The plates 31 and 32 define a groove-like gap in the axis direction of the shaft 22 between the adjacent end faces 31a and 32a at the upper part of the shaft 22 and a similar gap between the end faces 31b and 32b at the lower part of the shaft 22. The rib 30d engages with the gap between the end faces 31a and 32a, and the rib 30e engages with the gap between the end faces 31b and 32b (see FIG. 7). These engagements between the plates 31, 32 and the ribs 30d, 30e make up a rotation regulator 38 that regulates the relative rotation of the ring 30 and the plates 31, 32 around the axis of the shaft 22. The rotation regulator 38 is not essential. However, it is preferable to have the rotation regulator 38, because without the rotation regulator 38, the ring 30 and the plates 31, 32 may rotate relative to each other around the axis of the shaft 22, and this may lead to a failure of keeping enough sliding resistance between the plates 31, 32 and the shaft 22. The gaps between the plates 31 and 32 are continuous with the recessed portions 22c of the shaft 22. With this configuration, the ring 30 easily moves along the shaft 22 by sliding the ribs 30d and 30e from the recessed portions 22c to the gaps between the plates 31 and 32.

As illustrated in FIG. 3, the first coil spring 33 is disposed on the right of the ring 30, through which the shaft 22 is inserted. The first coil spring 33 is placed between the ring 30 and an adjustment nut 35a of the adjuster 35. The first coil spring 33 has an end 33a close to the ring 30, and the end 33a is fitted in the fitting hole 30b for holding (see FIGS. 3 and 7). The first coil spring 33 has an end close to the adjustment nut 35a, and this end is abutted against the adjustment nut 35a for holding.

The second coil spring 34 is disposed on the left of the ring 30, through which the shaft 22 is inserted. The second coil spring 34 is placed between the shaft connecting plate 24a of the first bracket 24 and the ring 30. The second coil spring 34 has an end 34a close to the ring 30, and the end 34a is fitted in the fitting hole 30c for holding (see FIGS. 3 and 7). The second coil spring 34 has an end close to the shaft connecting plate 24a, and this end is abutted against the shaft connecting plate 24a for holding.

The coil springs 33 and 34 bias the ring 30 to compress it in the axis direction of the shaft 22. At this time, when the ring 30 is viewed in the axis direction of the shaft insertion hole 30a, a first biasing point (fitting hole 30b) where the first coil spring 33 biases and a second biasing point (fitting hole 30c) where the second coil spring 34 biases are located in the diagonal direction of the shaft insertion hole 30a (see FIG. 7). With this configuration, the ring 30 rotates around the virtual axis in the top-bottom direction by the biasing forces from the coil springs 33 and 34. As a result, the ring 30 keeps an inclined posture in which the opening edge 36a on one side presses the first plate 31 and the opening edge 37a on the other side presses the second plate 32 (see FIG. 6B).

As illustrated in FIG. 3, the adjuster 35 is a double nut having the adjustment nut 35a and a stop nut 35b. The nuts 35a and 35b are screwed onto the external thread 22a of shaft 22. The adjustment nut 35a is a flange nut, for example, and the flange is placed close to the first coil spring 33. The stop nut 35b is for preventing loosening of the adjustment nut 35a. The adjuster 35 adjusts the tightening with the adjustment nut 35a so as to adjust the biasing force to the ring 30 from the first coil spring 33 and at the same time adjust the biasing force (reaction force) from the second coil spring 34.

Next, the following describes the structure of the torque imparting portion 28 that gives a rotational torque to the shaft 22 and the method of adjusting the rotational torque.

FIG. 6A illustrates the ring 30 with the released posture, in which the ring 30 does not receive the biasing forces from the coil springs 33 and 34, so that a gap G is formed between the inner peripheral faces 36 and 37 of the shaft insertion hole 30a and the plates 31 and 32. In this case, the ring 30 of the torque imparting portion 28 does not press the plates 31 and 32, and thus does not give a rotational torque to the shaft 22.

FIGS. 3 and 6B illustrate the ring 30 with the inclined posture, where the ring 30 receives the biasing forces from the coil springs 33 and 34, and thus the axis direction of the shaft insertion hole 30a intersects the axis direction of the shaft 22. With this inclined posture of the ring 30, the opening edge 36a of the inner peripheral face 36 on one side in the axis direction presses the first plate 31 and the opening edge 37a of the inner peripheral face 37 on the other side in the axis direction presses the second plate 32. That is, the ring 30 presses the shaft 22 so as to catch it via the plates 31 and 32. As a result, the plates 31 and 32 of the torque imparting portion 28 press the outer circumferential face of the shaft 22 as in the brake pads, and the sliding resistance there gives a rotational torque to the shaft 22.

The torque imparting portion 28 adjusts the tightening force with the adjustment nut 35a, and thus adjusts the pressing force to the plates 31 and 32 at the opening edges 36a and 37a, that is, the rotational torque to the shaft 22. The adjuster 35 includes the adjustment nut 35a to change the pressing force to the coil springs 33 and 34, and thus adjusts the elastic forces of the coil springs 33 and 34 to adjust the force of the ring 30 to press the plates 31 and 32 (shaft 22).

That is, the adjuster 35 is configured to transmit a change in the tightening with the adjustment nut 35a to the shaft 22 through the coil springs 33 and 34 and the ring 30, and thus enables fine adjustment of the rotational torque easily and thus widens the adjustment range. The inclined posture of the ring 30 refers to a posture of the ring 30 that presses the shaft 22, and this does not always mean the intersection of the axis directions between the shaft insertion hole 30a and the shaft 22.

Figure 8:
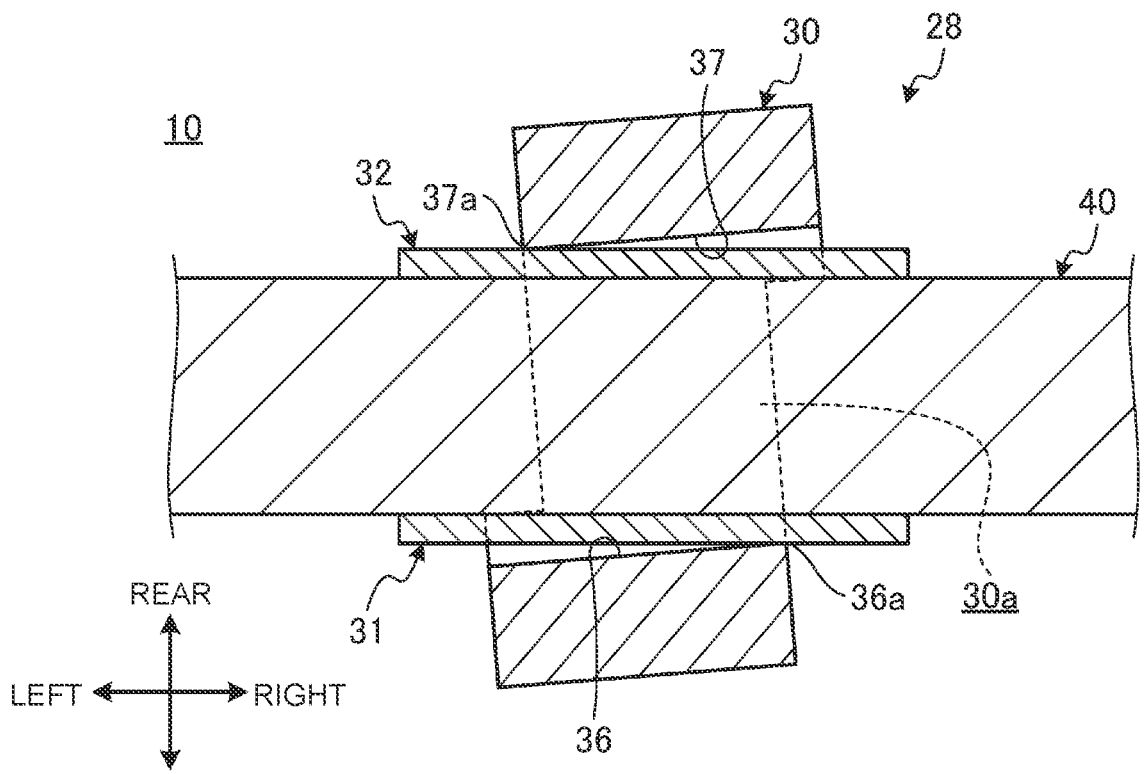
FIG. 8 is a schematic cross-sectional view of a shaft and a ring according to a modified example, taken along a plane in the axis direction of the shaft.

FIG. 8 is a schematic cross-sectional view of a shaft 40 and a ring 30 according to a modified example, taken along a plane in the axis direction of the shaft 40. In FIG. 8, like reference numerals indicate like parts having the same or similar configurations in FIGS. 1 through 7 and thus having the same functions and advantageous effects, and their detailed description is omitted. The same applies to FIGS. 9 to 17 described later. As illustrated in FIG. 8, the hinge device 10 may include a shaft 40 without the annular recessed portion 22b, instead of the shaft 22. In this case, the plates 31 and 32 project from the outer circumferential face of the shaft 40.

Figure 9:
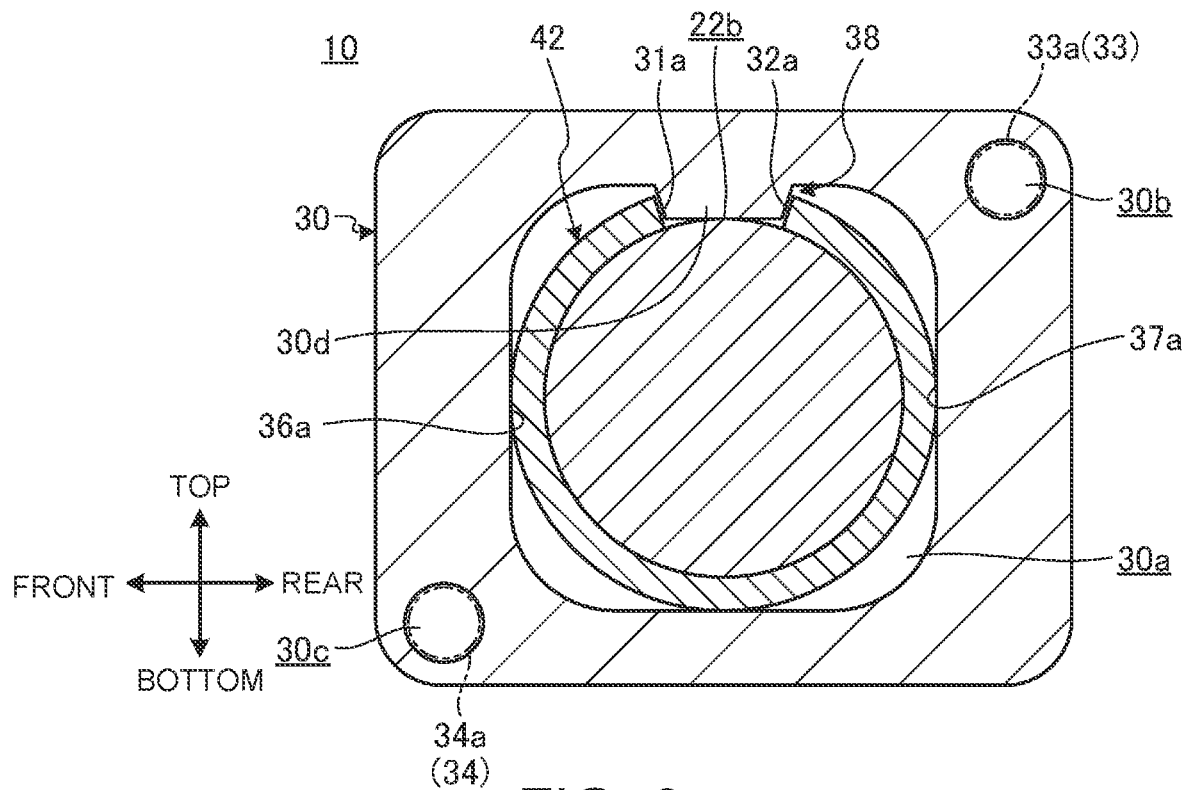
FIG. 9 is a schematic cross-sectional view of a hinge device having a plate according to a first modified example, taken along a plane orthogonal to the axis direction of a shaft.

FIG. 9 is a schematic cross-sectional view of a hinge device 10 having a plate 42 according to a first modified example, taken along a plane orthogonal to the axis direction of a shaft 22. As illustrated in FIG. 9, the hinge device 10 may include the single plate 42 having a substantially C-shaped cross section instead of the two plates 31 and 32. For instance, the plate 42 and a rib 30d that engages a gap (between the end faces 31a and 32a) in the C shape may make up a rotation regulator 38.

Figure 10:
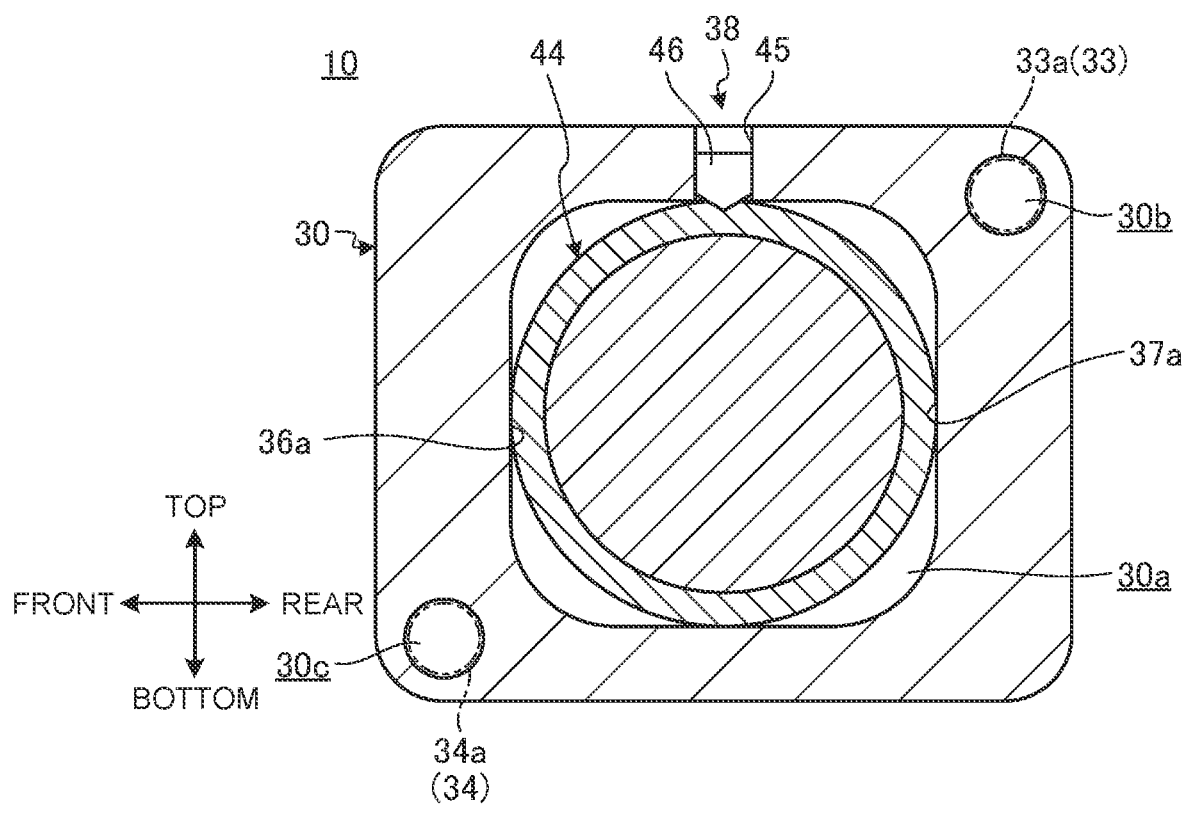
FIG. 10 is a schematic cross-sectional view of a hinge device having a plate according to a second modified example, taken along a plane orthogonal to the axis direction of a shaft.

FIG. 10 is a schematic cross-sectional view of a hinge device 10 having a plate 44 according to a second modified example, taken along a plane orthogonal to the axis direction of a shaft 22. As illustrated in FIG. 10, the hinge device 10 may include a single plate 44 that is cylindrically shaped, instead of the two plates 31 and 32. For instance, a set screw 46 screwed into a screw hole 45 in the ring 30 may be pressed into the outer circumferential face of the plate 44 to make up a rotation regulator 38.

Figure 11:
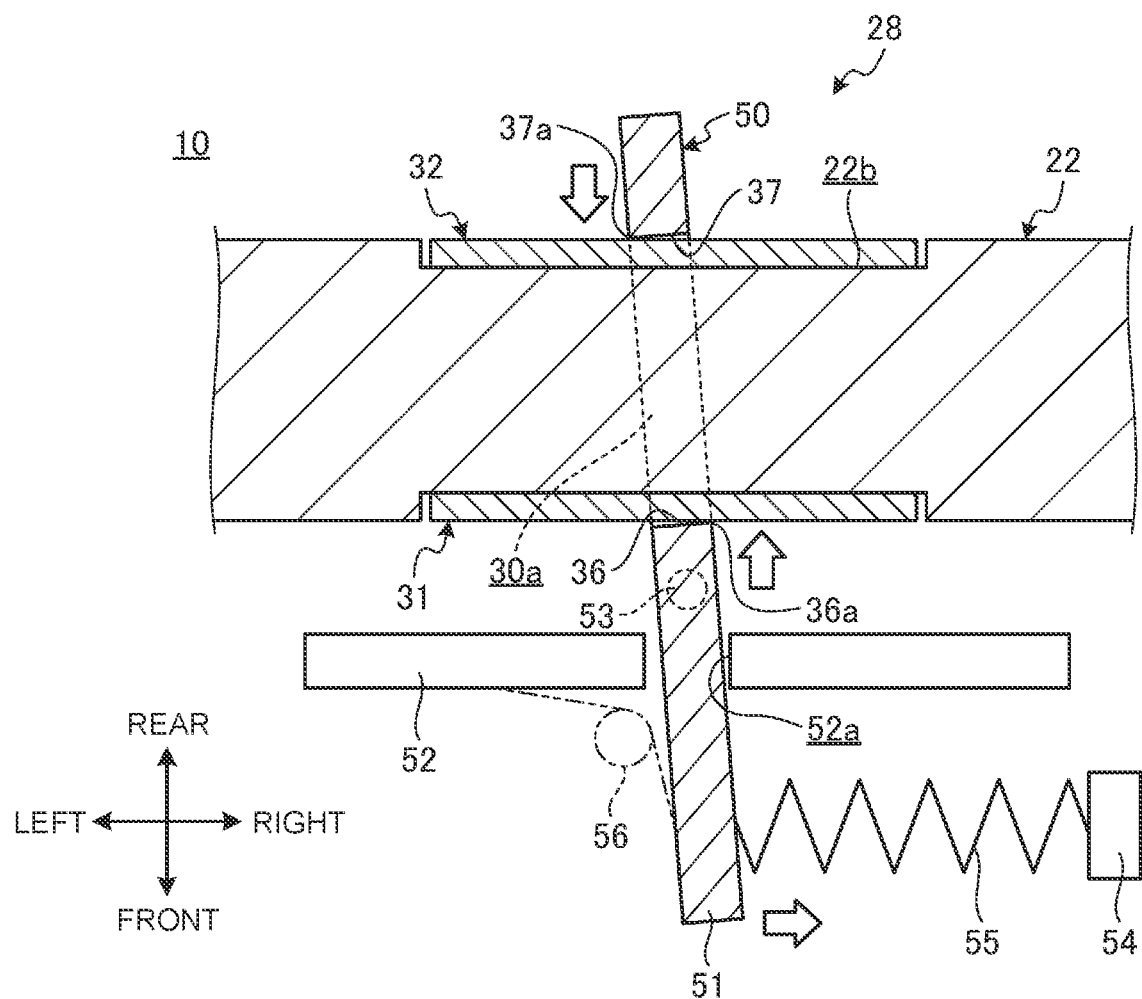
FIG. 11 is a schematic cross-sectional view of a ring and a shaft according to a modified example, taken along a plane in the axis direction of the shaft.

FIG. 11 is a schematic cross-sectional view of a ring 50 and a shaft 22 according to a modified example, taken along a plane in the axis direction of the shaft 22. As illustrated in FIG. 11, the hinge device 10 may include a ring 50 having an arm 51, instead of the ring 30.

As illustrated in FIG. 11, the ring 50 and the arm 51 are formed of a single metal plate, for example. The ring 50 is prepared by forming a shaft insertion hole 30a that penetrates this metal plate, through which the shaft 22 is inserted.

The arm 51 protrudes from an outer face of the ring 50 in the outer diameter direction. The arm 51 passes through an opening 52a of a wall 52 that is formed on an inner face of the lower cover 14c (or the upper cover 14b). The arm 51 is supported by a shaft pin 53 at a position between the opening 52a and the ring 50 to be rotatable relative to the first chassis 14. At a distal end of the arm 51, one end of a coil spring 55 is attached, and the other end of the coil spring 55 is supported by a support 54 formed on the inner face of the lower cover 14c (or the upper cover 14b). The coil spring 55 is a tension spring that biases the arm 51 to rotate about the shaft pin 53 counterclockwise in FIG. 11. The support 54 doubles as the adjuster 35, which is configured to allow adjustment of the biasing force of the coil spring 55 with the adjustment nut 35a and the stop nut 35b.

In this way, the torque imparting portion 28 may be configured to include the coil spring 55 located off the axis of the shaft 22 to bias the ring 50 into an inclined position.

This configuration keeps a large distance from the opening edges 36a, 37a, which are the points of action against the shaft 22 (plates 31, 32), to the point of effort by the coil spring 55. As a result, the coil spring 55 can impart a sufficient rotational torque to the shaft 22 with a small biasing force, which makes the coil spring 55 compact. This configuration does not include the coil spring 55 on the outer circumferential face of the shaft 22, and reduces the substantial outer diameter of the shaft 22.

As indicated by the alternate long and two short dashes line in FIG. 11, the torque imparting portion 28 may include a torsional coil spring 56 to bias the arm 51, instead of the coil spring 55. A pair of left and right coil springs 55 may be placed coaxially to bias the arm 51 from the left and right.

Figure 12:
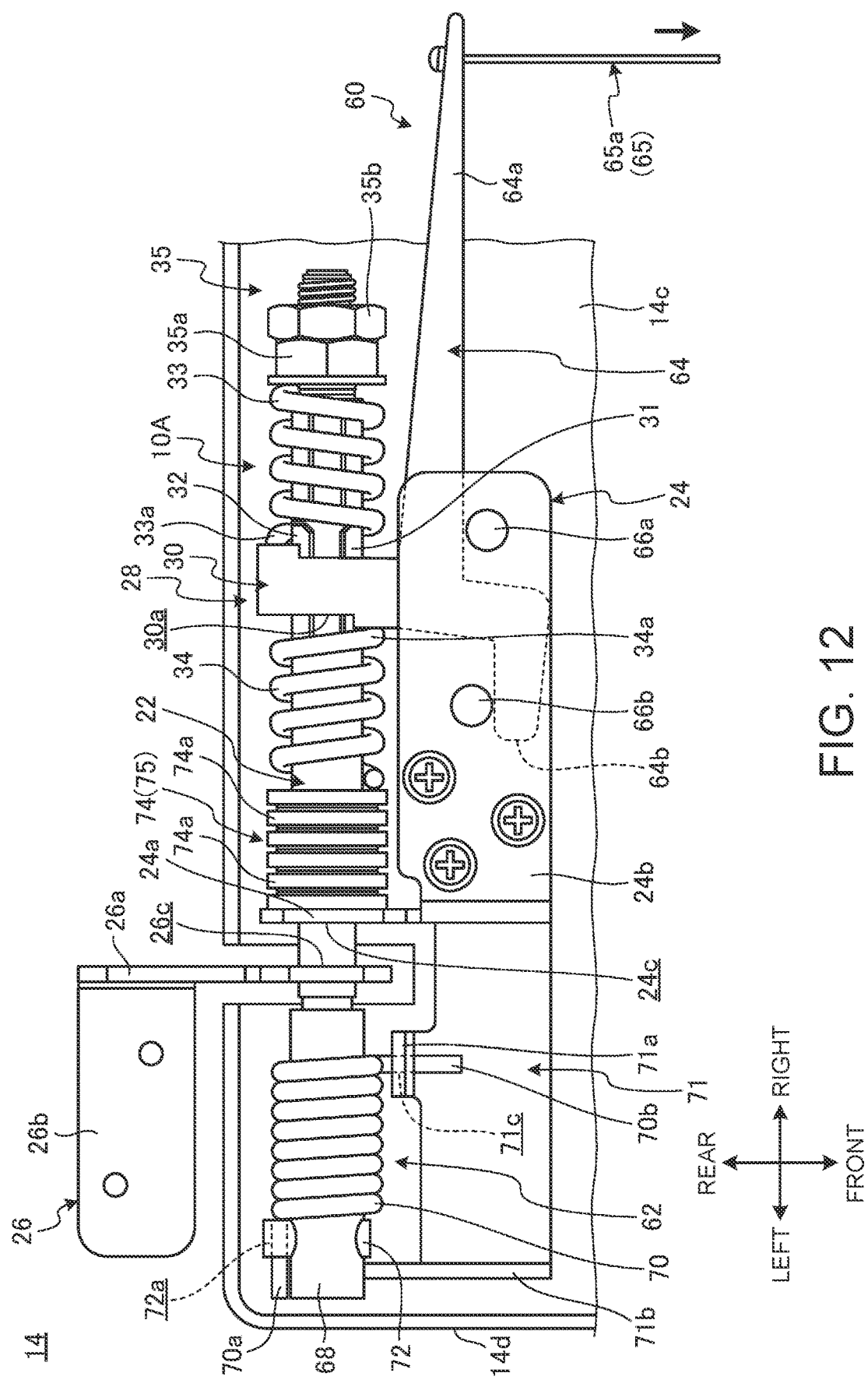
FIG. 12 is an enlarged plan view of a hinge device and its surroundings according to a second embodiment.

FIG. 12 is an enlarged plan view of a hinge device 10A and its surroundings according to a second embodiment. As illustrated in FIG. 12, the hinge device 10A of the present embodiment includes a clutch 60 and an automatic rotation mechanism 62 in addition to the shaft 22 and the torque imparting portion 28.

First, the clutch 60 will be described. The clutch 60 is a mechanism capable of disconnecting and connecting the rotational torque imparted to the shaft 22 from the torque imparting portion 28. The clutch 60 has a lever 64, a driver 65, and stoppers 66a and 66b.

Figure 13:
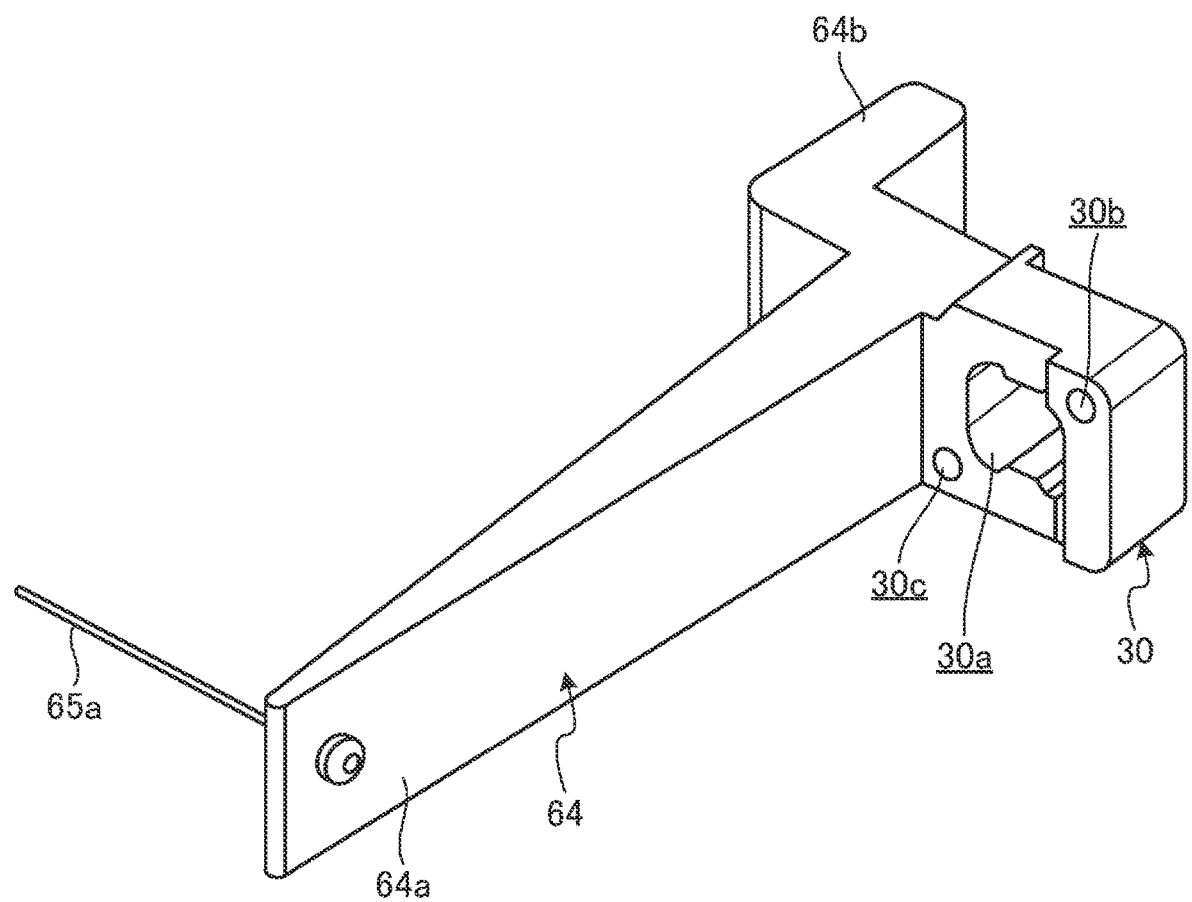
FIG. 13 is a perspective view of the lever.

FIG. 13 is a perspective view of the lever 64. The lever 64 is for forcibly rotating the ring 30 from the inclined posture to the released posture. As illustrated in FIGS. 12 and 13, the lever 64 is placed so as to project laterally from an outer face of the ring 30. For instance, the lever 64 is a metal component integrally molded with the ring 30. The lever 64 has a lever portion 64a and a hook portion 64b.

The lever portion 64a is a piece of plate tapered having a substantially triangular shape, and protrudes to the right in FIG. 12 from the outer face of the ring 30. One end of wire 65a making up the driver 65 is locked to the distal end of the lever portion 64a. The hook portion 64b is a piece of plate having a substantially L shape, and projects substantially forward from the outer face of the ring 30 and then bends to the left in FIG. 12.

The driver 65 is to rotate the lever 64. The driver 65 has the wire 65a. The wire 65a extends in the front-rear direction. The clutch 60 is configured so that pulling the wire 65a forward to rotate the lever 64 rotates the ring 30 from the inclined posture (see FIG. 14A) to the released posture (see FIG. 12 and FIG. 14B) against the biasing forces of the coil springs 33 and 34.

The stoppers 66a and 66b are metal round bars like pins, for example, which are for regulating the rotation range of the lever 64. The stoppers 66a and 66b stand upright in the top-bottom direction between the chassis connecting plate 24b of the first bracket 24 and the inner face of the lower cover 14c. The stopper 66a is placed to be contact with the front side face of the lever portion 64a. The stopper 66b is placed to be contact with the rear side face of the hook portion 64b at a distal end.

Figure 14A:
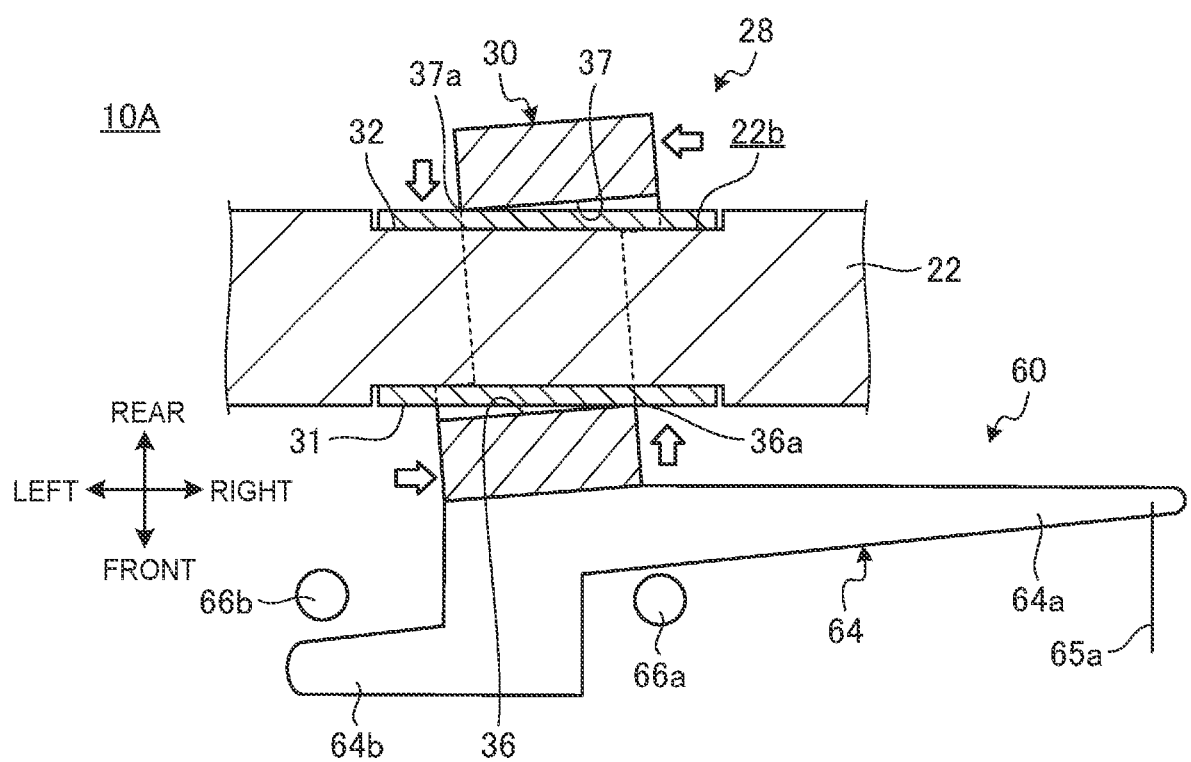
FIG. 14A is a schematic cross-sectional view of the hinge device illustrated in FIG. 12 with the ring in an inclined posture, taken along a plane in the axis direction of the shaft.
Figure 14B:
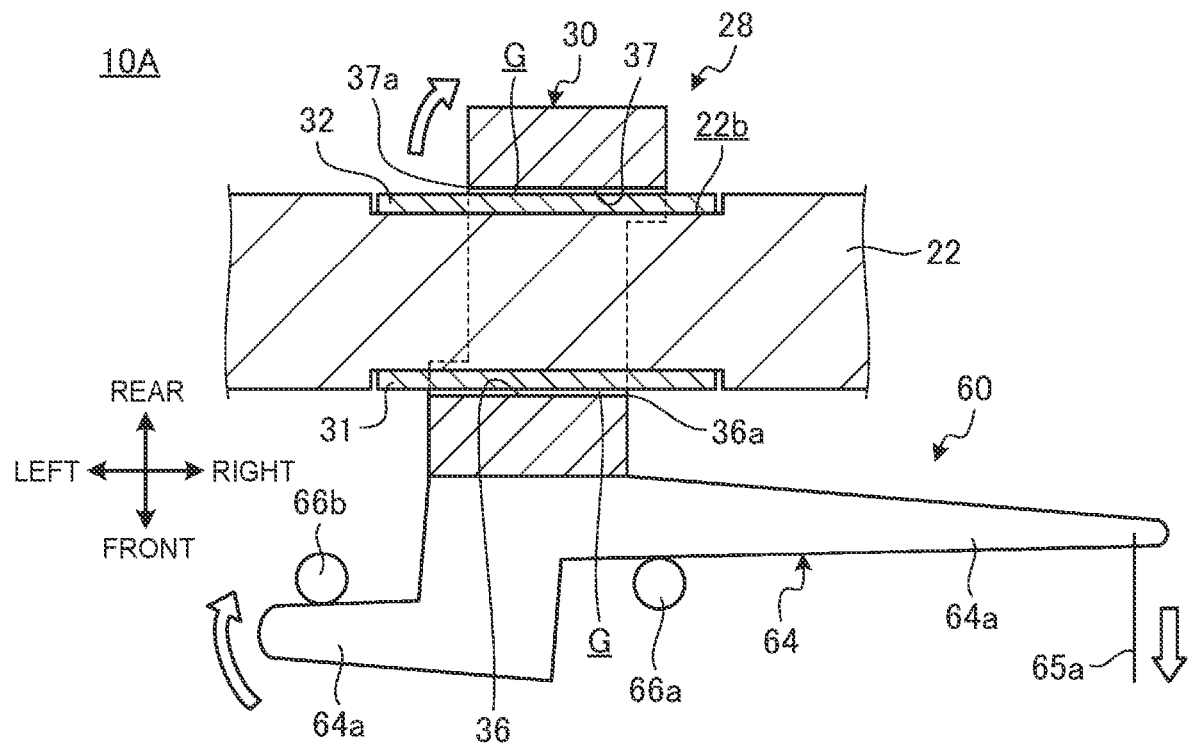
FIG. 14B is a cross-sectional view of the hinge device with the ring in a released posture after driving the clutch from the state of FIG. 14A.

Next, the following describes the operation of the clutch 60. FIG. 14A is a schematic cross-sectional view of the hinge device 10A illustrated in FIG. 12 with the ring 30 in an inclined posture, taken along a plane in the axis direction of the shaft 22. FIG. 14B is a cross-sectional view of the hinge device with the ring 30 in a released posture after driving the clutch 60 from the state of FIG. 14A.

As illustrated in FIG. 14A, before driving the driver 65 of the clutch 60, the ring 30 of the hinge device 10A receives the biasing forces from the coil springs 33 and 34 to have an inclined posture. The lever 64 also has a posture rotated counterclockwise in the drawing together with the ring 30. In this state, the torque imparting portion 28 imparts a predetermined rotational torque to the shaft 22.

Pulling the wire 65a forward from the state of FIG. 14A drives the clutch 60. Specifically, pulling the wire 65a rotates the lever 64 together with the ring 30 clockwise in the drawing against the biasing forces from the coil springs 33 and 34, so that the ring 30 has a released posture (see FIG. 14B). In other words, the clutch 60 disconnects the rotational torque imparted to the shaft 22 from the torque imparting portion 28. This disconnection of the rotational torque is kept as long as the driver 65 is driven to pull the wire 65a. When the pulling of the wire 65a is stopped, the lever 64 and the ring 30 return to the inclined posture by the biasing forces of the coil springs 33 and 34. As a result, the shaft 22 receives again a rotational torque from the torque imparting portion 28.

During the motion of the clutch 60, a contact of the lever 64 with the stoppers 66a and 66b regulates a further rotation of the lever 64 (see FIG. 14B). This prevents the lever 64 from keeping rotation after the ring 30 changes from the inclined posture to the released posture. If the ring 30 rotates beyond the released posture, it will have an inclined posture inverted to the left and right from that illustrated in FIG. 14A. This results in giving a rotational torque to the shaft 22 again, even though the clutch 60 disconnects the rotational torque. The rotational range of the lever 64 may be regulated by controlling the driver 65, for example. In this case, the stoppers 66a, 66b may be omitted together with the hook portion 64b.

Next the following describes the automatic rotation mechanism 62. As illustrated in FIG. 12, the automatic rotation mechanism 62 is to automatically rotate the shaft 22 in a predetermined rotation direction in response to disconnection of the rotational torque to the shaft 22 by the clutch 60. As a result, the automatic rotation mechanism 62 automatically rotates the second chassis 16 whose rotation becomes smoother after disconnection of the rotation torque to the shaft 22 in the closing direction or the opening direction relative to the first chassis 14.

As illustrated in FIG. 12, the automatic rotation mechanism 62 includes a shaft extension 68, a coil spring 70, and a support bracket 71.

The support bracket 71 is formed integrally with the first bracket 24, and is a metal plate projecting to the left or right that is in the opposite direction of the chassis connecting plate 24b. The support bracket 71 includes a spring support plate 71a extending in the top, bottom, left and right directions, and a shaft support plate 71b extending in the top, bottom, front and rear directions. The support bracket 71 may be formed separately from the first bracket 24. The support plates 71a and 71b may be formed separately.

The shaft extension 68 is an extended portion of the end of the shaft 22 beyond the shaft connecting plate 26a of the second bracket 26. The distal end of the shaft extension 68 is rotatably supported by the shaft support plate 71b to suppress rattling. The shaft support plate 71b may be omitted. The distal end of the shaft extension 68 has a hole penetrating through it in the outer diameter direction, into which a support pin 72 is inserted for fixing. The support pin 72 has a fitting hole 72a at a portion protruding from the outer circumferential face of the shaft extension 68. The fitting hole 72a penetrates through the support pin 72 in the axis direction of the shaft 22.

The coil spring 70 winds around the shaft extension 68. The coil spring 70 is placed between the shaft connecting plate 26a and the support pin 72. The coil spring 70 has an end 70a close to the support pin 72, and this end is fitted in the fitting hole 72a of the support pin 72 for holding. The coil spring 70 has an end 70b close to the shaft connecting plate 26a, and this end is fitted in the fitting hole 71c of the spring support plate 71a for holding. In this way, the coil spring 70 is fixed at one end to the shaft 22 (shaft extension 68) and at the other end to the first chassis 14. With this configuration, the coil spring 70 accumulates an elastic force as the shaft 22 rotates in a predetermined direction. The rotation direction of the shaft 22 to let the coil spring 70 accumulate the elastic force depends on the helical direction of the coil spring 70 relative to the shaft extension 68.

As illustrated in FIG. 12, the hinge device 10A further includes a second torque imparting portion 74. The second torque imparting portion 74 includes the lamination of a plurality of discs 74a, each of which has a through hole at the axial center, and the shaft 22 is inserted into these through holes for fitting and fixing. The second torque imparting portion 74 is placed between the shaft connecting plate 24a of the first bracket 24 and the second coil spring 34.

Each disc 74a is a flat spring formed of a metal plate like a dish. Each disc 74a imparts a rotational torque to the shaft 22 with frictional resistance between adjacent discs 74a and 74a. The lamination includes at least two discs 74a, and the disc 74a located closest to the shaft connecting plate 24a is pressed by another disc 74a against the shaft connecting plate 24a to slide the shaft connecting plate 24a. This configuration allows the second torque imparting portion 74 to impart a predetermined rotational torque to the relative rotation between the shaft 22 and the shaft connecting plate 24a. Of the discs 74a, the disc 74a closest to the second coil spring 34 supports the end of the second coil spring 34.

Figure 16:
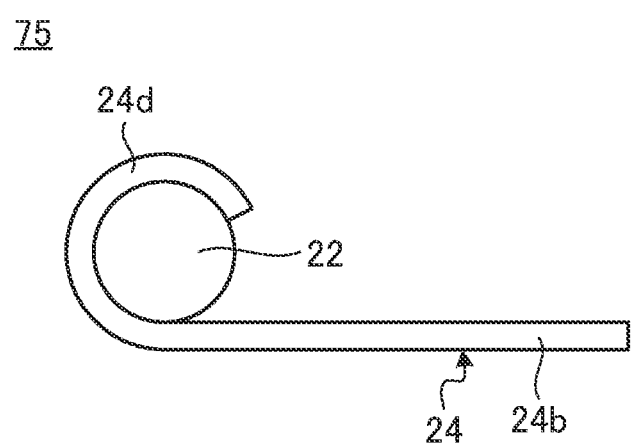
FIG. 16 is a side view schematically illustrating the configuration of a second torque imparting portion according to a modified example.

As illustrated in FIG. 16, the hinge device 10A may include a second torque imparting portion 75, instead of the second torque imparting portion 74. The second torque imparting portion 75 includes the first bracket 24 having a curl portion 24d instead of the shaft connecting plate 24a. The curl portion 24d is configured by bending the first bracket 24 of the metal plate into a curl shape, and press-fitting the shaft 22 into the inner peripheral to be relatively rotatable. This configuration generates sliding resistance during the relative rotation between the curl portion 24d and the shaft 22, so that the second torque imparting portion 75 imparts a rotational torque to the shaft 22.

Next the following describes the operation of the automatic rotation mechanism 62. In the following example, the automatic rotation mechanism 62 rotates the second chassis 16 opened in the range of 90 to 180 degrees (see FIG. 15C), for example, to the closing state (see FIG. 15A). Point O in FIGS. 15A to 15C indicates the axis of the shaft 22.

Figure 15A:
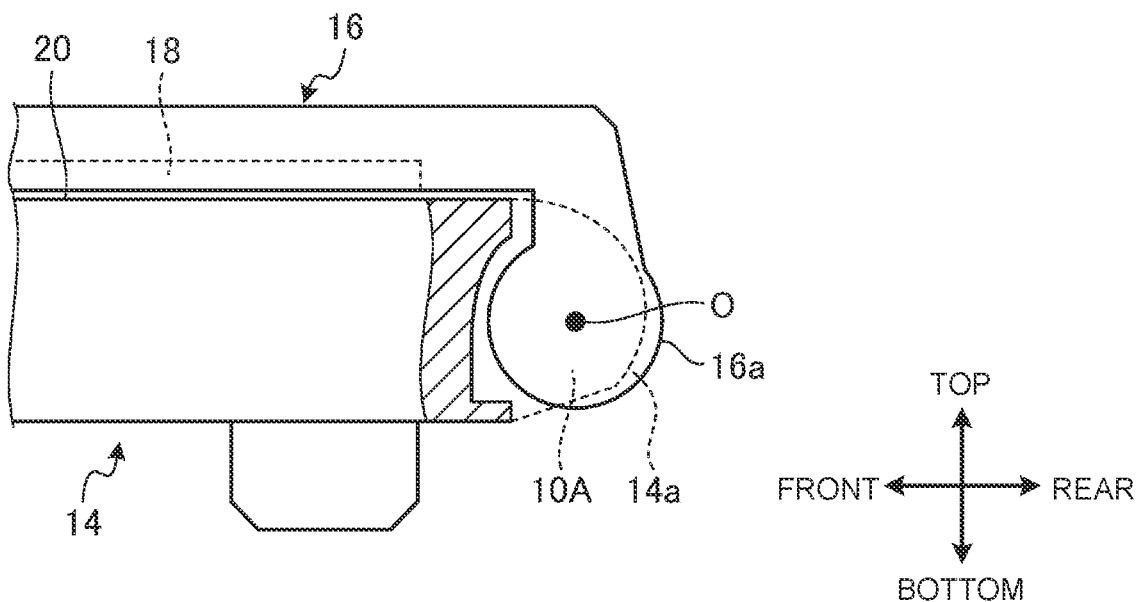
FIG. 15A is a schematic enlarged cross-sectional side view of the hinge device having a 0-degree posture between the chassis, and its surroundings.
Figure 15B:
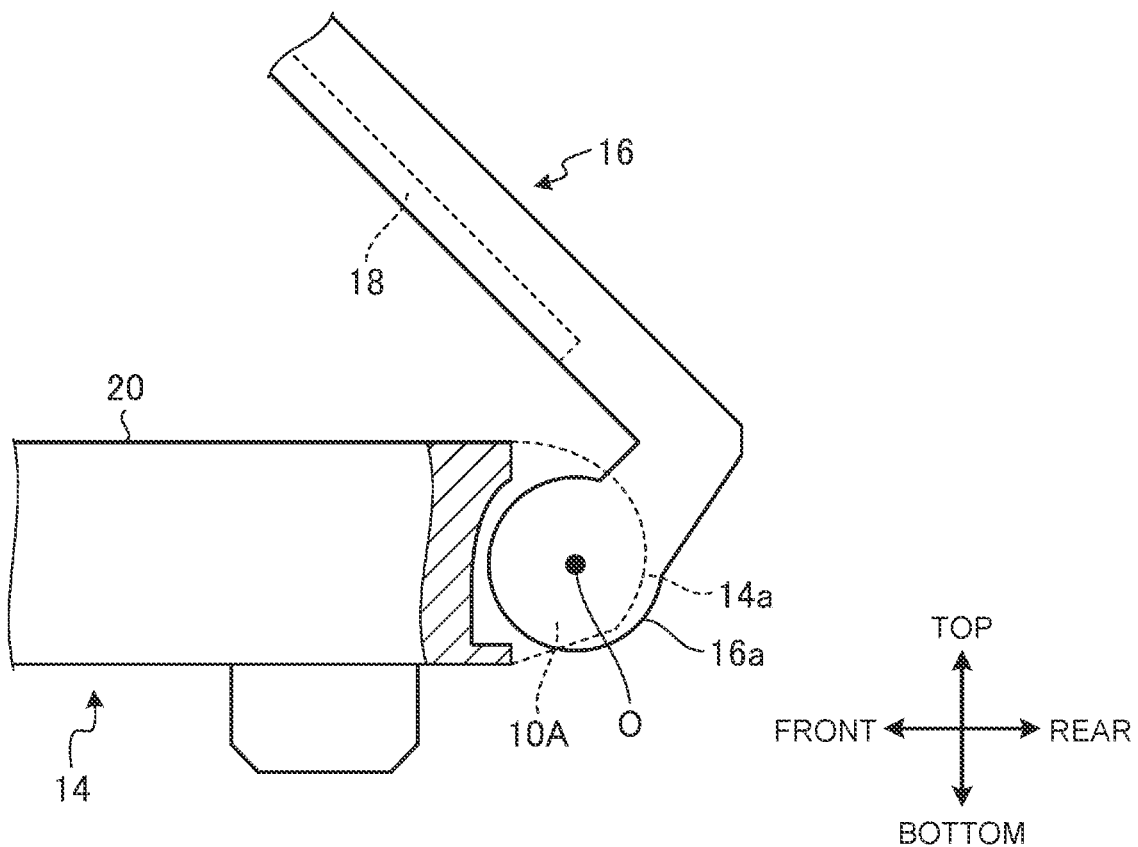
FIG. 15B is a schematic cross-sectional side view of the hinge device having a 45-degree posture between the chassis after the posture of FIG. 15A.

The automatic rotation mechanism 62 of the present embodiment is configured so that, when rotating between the chassis 14 and 16 from the 0-degree posture in FIG. 15A to the 45-degree posture in FIG. 15B, the coil spring 70 does not accumulate an elastic force. The coil spring 70 starts accumulating an elastic force when the chassis 14 and 16 rotate from the 45-degree posture in FIG. 15B, and the accumulated force gradually increases to the 180-degree posture in FIG. 15C. The elastic force of the coil spring 70 is set so that the maximum accumulated force at the 180-degree posture is smaller than the rotational torque that the torque imparting portions 28 and 74 impart to the shaft 22. With this configuration, the second chassis 16 stably holds each angle posture between the 0 degree posture and the 180 degree posture unless the clutch 60 operates.

For example, when the driver 65 of the clutch 60 is driven during normal operation where the second chassis 16 has the posture in the range of 90 degree to 180 degree, the torque imparted from the torque imparting portion 28 to the shaft 22 is disconnected. In the present embodiment, the rotational torque that the second torque imparting portion 74 imparts to the shaft 22 is smaller than the elastic force accumulated in the coil spring 70 when the second chassis 16 is set to an angular posture of at least 90 degrees. This means that, in response to the operation of the clutch 60, the coil spring 70 rotates the shaft 22 in the closing direction, so that the second chassis 16 automatically rotates in the closing direction. In this case, the second torque imparting portion 74 of the hinge device 10A imparts a minimum rotational torque to the shaft 22. This avoids rotation of the second chassis 16 vigorously in the closing direction to collide with the first chassis 14.

As described above, the automatic rotation mechanism 62 of the present embodiment is configured to lose the elastic force of the coil spring 70 when the second chassis 16 is closed to the 45-degree posture. This prevents, even if the automatic rotation mechanism 62 operates when a foreign object such as a writing instrument is placed on the top face of the first chassis 14, the chassis 14 and 16 from pinching this object therebetween. In another configuration, the elastic force by the coil spring 70 starts accumulating from the angular posture of 45 degrees or less. The present embodiment may be configured so that, after the angular posture of 45 degree or less illustrated in FIG. 15B, the automatic rotation mechanism 62 enables slow closing operation of the second chassis 16 to around 0 degree due to its own weight while receiving the rotational torque from the second torque imparting portion 74.

Figure 15C:
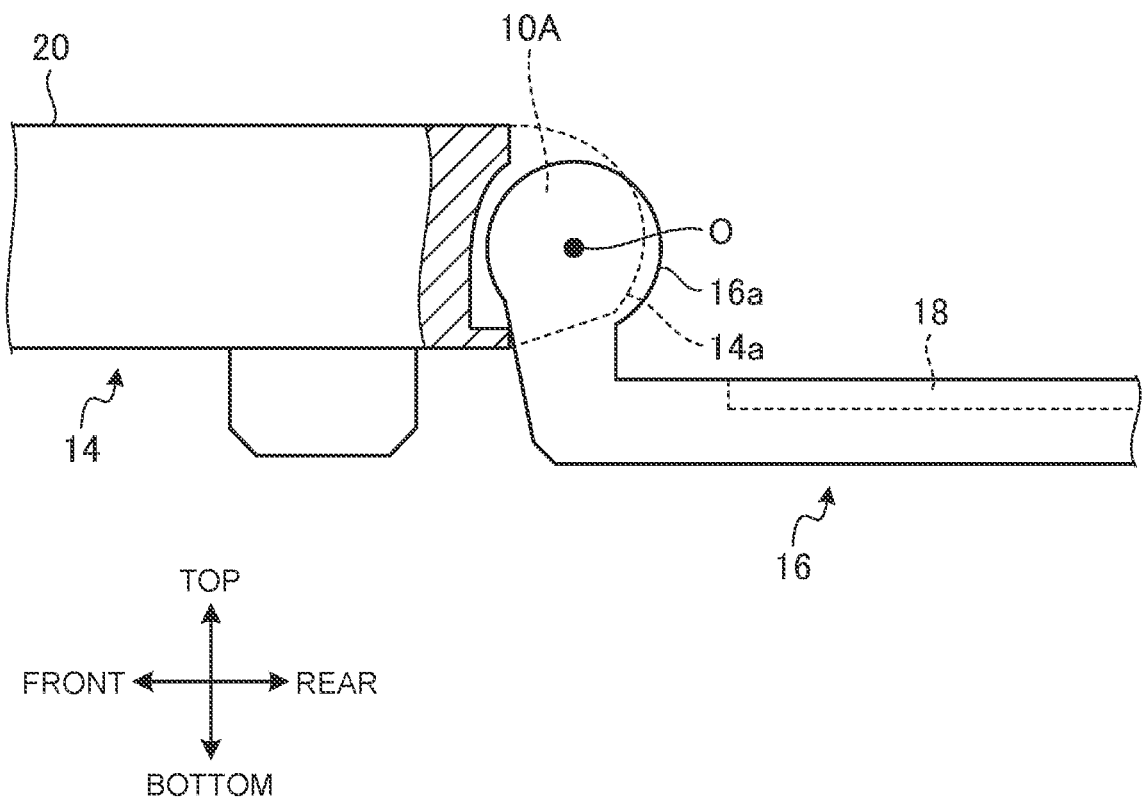
FIG. 15C is a schematic cross-sectional side view of the hinge device having a 180-degree posture between the chassis after the posture of FIG. 15B.

The automatic rotation mechanism 62 may be configured to rotate the closed second chassis 16 (see FIG. 15A) in the opening direction (see FIG. 15C). This configuration can be achieved by reversing the direction of rotation of the shaft 22 when the coil spring 70 accumulates the elastic force. The automatic rotation mechanism 62 may be activated by an electric motor instead of the coil spring 70. The automatic rotation mechanism 62 with this configuration enables rotation of the second chassis 16 selectively between the closing direction and the opening direction under the control with the motor.

The electronic apparatus may include the hinge devices 10A as described above on the left and right of the chassis 14 and 16 as a pair or on only one of them. In the case of the hinge device 10A equipped with the clutch 60 and the automatic rotation mechanism 62 on one of the left and right, a simplified hinge device 10B may be placed instead of the hinge device 10A on one side, and another simplified hinge device 10C may be placed on the other side as illustrated in FIG. 17.

Figure 17:
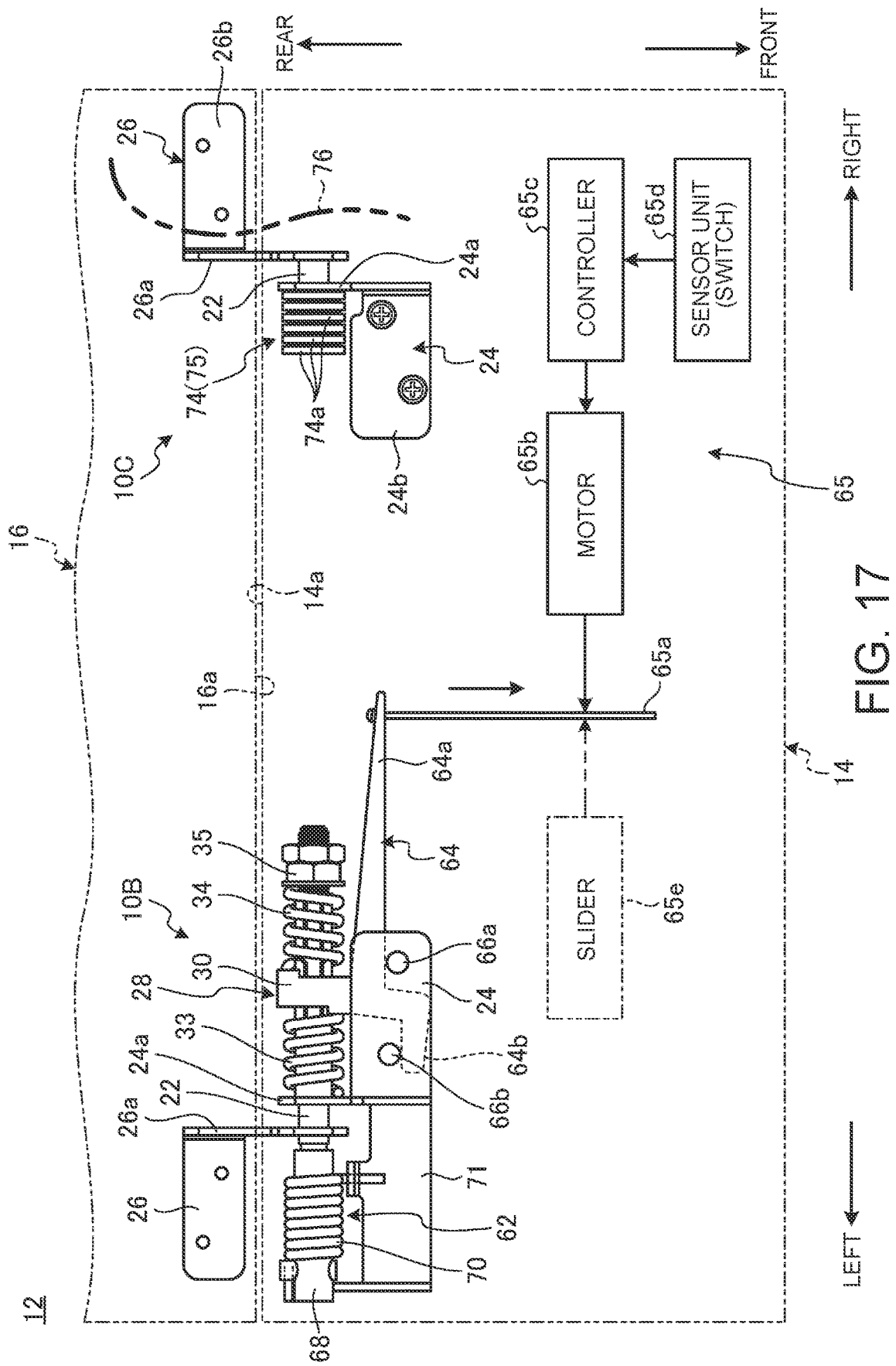
FIG. 17 is a schematic enlarged plan view of the configuration of a major part of the electronic apparatus equipped with hinge devices according to a third embodiment.

FIG. 17 is a schematic enlarged plan view of the configuration of a major part of the electronic apparatus 12 equipped with the hinge devices 10B and 10C according to a third embodiment. As illustrated in FIG. 17, the hinge device 10B has the configuration of the hinge device 10A of FIG. 12 without the second torque imparting portion 74 (75). In the electronic apparatus 12 in FIG. 17, one of the pair of hinge devices is the hinge device 10B and the other is the hinge device 10C (see also FIG. 1).

In the hinge device 10B, the driver 65 of the clutch 60 may be configured to include a motor 65b connected to the wire 65a, a controller 65c for controlling the rotation of the motor 65b, and a sensor unit 65d.

The motor 65b pulls the wire 65a forward via a predetermined speed reducer, for example. The controller 65c receives an input signal from the sensor unit 65d and controls the motor 65b. The controller 65c may be implemented through the execution of a program by a processor such as a central processing unit (CPU) mounted on a motherboard in the first chassis 14, i.e., by software, or may be implemented by hardware, such as an IC (integrated circuit). The controller may be implemented by software as well as hardware. For instance, the sensor unit 65d is installed at the upper front of the second chassis 16 and is a human-detecting sensor including a camera (see FIG. 1). The sensor unit 65d may include a switch operated directly by the user in place of the human-detecting sensor or together with the human-detecting sensor (see the sensor unit 65d indicated with the alternate long and two short dashes line in FIG. 1).

As illustrated in FIG. 17, the driver 65 may have a configuration in which the slider 65e is connected to the wire 65a, instead of the motor 65b, the controller 65c, and the sensor unit 65d. The slider 65e is a slide switch to let the user directly slide to pull the wire 65a. For instance, the slider 65e is installed on the top (or side) face of the first chassis 14 (see FIG. 1). The driver 65 including the slider 65e does not need components such as the motor 65b, and thus has a simple configuration to reduce the cost.

As illustrated in FIG. 17, the hinge device 10C includes a shaft 22, brackets 24, 26, and a second torque imparting portion 74 (75). That is, the hinge device 10C is a typical torque hinge that does not include the ring 30 or the clutch 60. The hinge device 10C has a simple configuration compared with the hinge devices 10B (10, 10A), and thus allows the cable 76 connecting the chassis 14 and 16 to pass therethrough easily.

In the configuration example illustrated in FIG. 17, the rotational torques of the hinge devices 10B and 10C preferably are set evenly. The elastic force accumulated in the coil spring 70 of the automatic rotation mechanism 62 is set larger than the rotational torque of the hinge device 10C when the second chassis 16 is at least at 90 degrees.

With the configuration equipped with these hinge devices 10B and 10C, when the user leaves the seat and is away from the front face of the electronic apparatus 12 during the use of the electronic apparatus having the second chassis 16 in an angular posture of 90 to 180 degrees, for example, the sensor unit 65d detects the absence of the user. The controller 65c then drives the motor 65b to pull the wire 65a, and stops the rotational torque that the torque imparting portion 28 imparts to the shaft 22. This causes the hinge device 10B to release the rotational torque. Alternatively, the user operates the slider 65e before leaving the seat to release the rotational torque of the hinge device 10B. The hinge device 10C keeps its rotational torque. As a result, the automatic rotation mechanism 62 operates to automatically rotate the second chassis 16 in the closing direction. Although the specific description has been omitted, the motor 65b, the controller 65c and the sensor unit 65d, or the slider 65e are applicable to the hinge device 10A described above.

As described above, the hinge device 10 (10A, 10B) of the above embodiment includes the shaft 22 and the torque imparting portion 28 that imparts a rotational torque to the shaft 22. The torque imparting portion 28 includes: the ring 30 (50) through which the shaft 22 passes; the elastic member (coil springs 33, 34, 55 or torsion coil spring 56) that biases the ring 30 (50) to incline the ring 30 (50) relative to the shaft 22; and the adjuster 35 that adjusts the biasing force of the elastic member to the ring 30.

Thus, the torque imparting portion 28 adjusts the force that the ring 30 presses the shaft 22 (plates 31, 32) via the elastic member, that is, the rotational torque to the shaft 22 through the operation with the adjuster 35. In other words, the hinge device 10 (10A, 10B) does not adjust the rotational torque directly by the tightening amount of the adjustment nut 35a of the adjuster 35, but adjusts the rotational torque indirectly through the elastic member. The hinge device 10 (10A, 10B) therefore enables easy adjustment of the rotational torque to the shaft 22, and has a wide adjustment range.

The hinge device including the lamination of the discs 74a as in the hinge device 10C having the torque imparting portion 74 needs to have a large surface area of the discs 74a to generate a larger torque. This needs an increase in the outer diameter of the discs, and thus inhibits thinning of the electronic apparatus 12. On the contrary, the torque imparting portion 28 has a wide adjustment range as described above, and does not require an increase in outer diameter to increase the torque. The configuration including the curl portion 24d as in the hinge device 10C having the torque imparting portion 75 has difficulty in torque adjustment after assembling unlike the torque imparting portion 28.

The hinge device 10 (10A, 10B) may be configured to omit the plates 31 and 32, so that the ring 30 directly press the shaft 22. This means that the opening edges 36a and 37a of the ring 30 press the shaft 22 with a point contact or line contact. Therefore, the ring 30 and the shaft 22 are likely to be unevenly worn. To avoid this, the hinge device 10 (10A, 10B) of the above embodiment is configured to transmit the pressing force from the ring 30 to the shaft 22 via the plates 31 and 32. Although the opening edges 36a and 37a press the plates 31 and 32 with a point contact or line contact, this pressing force is diffused by the plates 31 and 32 to disperse the pressing force over the shaft 22. This can suppress the uneven wear of the ring 30 and the shaft 22 described above.

The present invention is not limited to the above-described embodiments, and can be modified freely without deviating from the scope of the present invention.

In the above, the hinge device 10 (10A, 10B) includes a single-axis hinge, which may include a two-axis hinge. In this case, the torque imparting portion 28 and the clutch 60 may be configured corresponding to one or two axes.

DESCRIPTION OF SYMBOLS 10, 10A to 10C hinge device
12 electronic apparatus
14 first chassis
16 second chassis
22, 40 shaft
24 first bracket
26 second bracket
28 torque imparting portion
30, 50 ring
30a shaft insertion hole
31 first plate
32 second plate
33 first coil spring
34 second coil spring
35 adjuster
42, 44 plate
60 clutch
62 automatic rotation mechanism
64 lever
74, 75 second torque imparting portion

What is claimed is:

1. A hinge device comprising:
a shaft rotatable around an axis thereof; and
a torque imparting portion configured to impart a rotational torque to rotation of the shaft, wherein
the torque imparting portion comprises:
   a ring having a shaft insertion hole through which the shaft is inserted with rattling, the ring covering a part of an outer circumferential face of the shaft in the axis direction;
   an elastic member that biases the ring in the axis direction from a position displaced from the axis of the shaft; and
   an adjuster configured to adjust a force that the elastic member biases the ring, and
the torque imparting portion is configured so that the elastic member biases the ring to press the shaft while catching the shaft at a first opening edge of the shaft insertion hole on one side in the axis direction and at a second opening edge on the other side, and thus impart a rotational torque to the shaft.

2. The hinge device according to claim 1, wherein
the torque imparting portion further comprises a plate between the first and second opening edges of the ring and an outer circumferential face of the shaft, the plate sliding relative to the outer circumferential face of the shaft.

3. The hinge device according to claim 2, wherein
the plate comprises:
   an arc-shaped first plate disposed between the first opening edge and the outer circumferential face of the shaft; and
   an arc-shaped second plate disposed between the second opening edge and the outer circumferential face of the shaft.

4. The hinge device according to claim 2, wherein
the torque imparting portion further comprises a rotation regulator configured to regulate relative rotation between the ring and the plate.

5. The hinge device according to claim 1, wherein
the elastic member comprises:
   a first coil spring disposed on one side of the ring in the axis direction of the shaft, through which the shaft is inserted; and
   a second coil spring disposed on the other side of the ring in the axis direction of the shaft, through which the shaft is inserted, and
when the ring is viewed in the axis direction of the shaft insertion hole, a first biasing point where the first coil spring biases the ring and a second biasing point where the second coil spring biases the ring are located in a diagonal direction of the shaft insertion hole.

6. The hinge device according to claim 1, wherein
the torque imparting portion further comprises an arm extending from the ring, and
the elastic member is configured so that biasing the arm biases the ring.

7. The hinge device according to claim 1, further comprising:
a clutch configured to disconnect a rotational torque that the torque imparting portion imparts to the shaft, wherein
the clutch comprises:
   a lever protruding from the ring; and
   a driver configured to rotate the lever, and
when the driver rotates the lever, the clutch rotates the ring against the biasing force from the elastic member to a released posture where the first opening edge and the second opening edge have a gap with the shaft.

8. The hinge device according to claim 7, wherein
the clutch further comprises a stopper that, when the ring has the released posture, comes into contact with the lever to regulate a further rotation of the lever.

9. The hinge device according to claim 7, further comprising an automatic rotation mechanism configured to automatically rotate the shaft in a predetermined rotation direction in response to disconnection of the rotational torque by the clutch.

10. An electronic apparatus comprising:
a first chassis;
a second chassis adjacent to the first chassis; and
a hinge device comprising:
   a shaft rotatable around an axis thereof; and
   a torque imparting portion configured to impart a rotational torque to rotation of the shaft, wherein
the hinge device connecting the first chassis and the second chassis in a relatively rotatable manner,
the torque imparting portion comprises:
   a ring having a shaft insertion hole through which the shaft is inserted with rattling, the ring covering a part of an outer circumferential face of the shaft in the axis direction;
   an elastic member that biases the ring in the axis direction from a position displaced from the axis of the shaft; and
   an adjuster configured to adjust a force that the elastic member biases the ring, and
the torque imparting portion is configured so that the elastic member biases the ring to press the shaft while catching the shaft at a first opening edge of the shaft insertion hole on one side in the axis direction and at a second opening edge on the other side, and thus impart a rotational torque to the shaft.

11. The electronic apparatus according to claim 10, wherein
the hinge device further comprises:
   a clutch configured to disconnect a rotational torque that the torque imparting portion imparts to the shaft; and
   an automatic rotation mechanism configured to automatically rotate the shaft in a predetermined rotation direction in response to disconnection of the rotational torque by the clutch.

12. The electronic apparatus according to claim 11, further comprising:
a second hinge device comprising:
   a second shaft rotatable around an axis thereof; and
   a second torque imparting portion configured to impart a rotational torque to rotation of the second shaft, wherein
the second hinge device and the hinge device connect the first chassis and the second chassis in a relatively rotatable manner,
the second torque imparting portion is configured so that a flat spring fixed to the second shaft is pressed against a bracket fixed to one of the first and second chassis and relatively rotatably connected to the second shaft, or so that the second shaft is press-fitted in a relatively rotatable manner to a curl portion of a bracket fixed to one of the first and second chassis.

* * * * *